United States Patent
Heo et al.

(10) Patent No.: US 8,943,427 B2
(45) Date of Patent: Jan. 27, 2015

(54) METHOD FOR PROVIDING USER INTERFACE BASED ON MULTIPLE DISPLAYS AND MOBILE TERMINAL USING THE SAME

(75) Inventors: Keunjae Heo, Seoul (KR); Chaejoo Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 954 days.

(21) Appl. No.: 13/089,203

(22) Filed: Apr. 18, 2011

(65) Prior Publication Data

US 2012/0060089 A1 Mar. 8, 2012

(30) Foreign Application Priority Data

Sep. 3, 2010 (KR) ........................ 10-2010-0086684

(51) Int. Cl.
*G06F 3/14* (2006.01)
*G06F 3/048* (2013.01)
*G06F 1/16* (2006.01)
*H04M 1/02* (2006.01)
*G06F 3/0485* (2013.01)
*G06F 3/0486* (2013.01)
*G06F 3/0488* (2013.01)

(52) U.S. Cl.
CPC ............ *G06F 3/1431* (2013.01); *G06F 1/1647* (2013.01); *H04M 1/0206* (2013.01); *G06F 3/0485* (2013.01); *G06F 3/0486* (2013.01); *G06F 3/04883* (2013.01); *G06F 1/1616* (2013.01); *G06F 1/1624* (2013.01); *G06F 1/1677* (2013.01); *G09G 2300/023* (2013.01); *G09G 2340/10* (2013.01); *G06F 2203/04803* (2013.01); *G06F 2203/04804* (2013.01)
USPC .......................................... 715/768; 715/864

(58) Field of Classification Search
USPC .................................. 715/702, 864, 768, 769
See application file for complete search history.

(56) References Cited

U.S. PATENT DOCUMENTS

| | | | |
|---|---|---|---|
| 2007/0245269 A1* | 10/2007 | Kim et al. | 715/856 |
| 2009/0298548 A1* | 12/2009 | Kim et al. | 455/566 |
| 2011/0050594 A1* | 3/2011 | Kim et al. | 715/863 |
| 2011/0077083 A1* | 3/2011 | Ahn et al. | 463/37 |
| 2012/0190438 A1* | 7/2012 | Bartosik et al. | 463/31 |

FOREIGN PATENT DOCUMENTS

| | | |
|---|---|---|
| CN | 1734392 | 2/2006 |
| CN | 101594403 | 12/2009 |
| CN | 201435744 | 3/2010 |
| EP | 2129084 | 12/2009 |

OTHER PUBLICATIONS

The State Intellectual Property Office of the People's Republic of China Application Serial No. 201110222988.2, Office Action dated Nov. 5, 2013, 10 pages.

* cited by examiner

*Primary Examiner* — Weilun Lo
*Assistant Examiner* — Truc Chuong
(74) *Attorney, Agent, or Firm* — Lee, Hong, Degerman, Kang & Waimey

(57) ABSTRACT

Disclosed is a user interface, and particularly, to a method for providing a user interface based on multiple displays and a mobile terminal using the same. The method for providing a user interface of a mobile terminal comprises controlling transparency of a first display unit, controlling the first display unit to display a first screen, controlling a second display unit to display a second screen, and controlling the second display unit to display one or more parts of the first screen.

27 Claims, 18 Drawing Sheets

METHOD FOR PROVIDING USER INTERFACE BASED ON MULTIPLE DISPLAYS AND MOBILE TERMINAL USING THE SAME

CROSS-REFERENCE TO A RELATED APPLICATION

Pursuant to 35 U.S.C. §119(a), this application claims the benefit of earlier filing date and right of priority to Korean Application No. 10-2010-0086684, filed on Sep. 3, 2010, the contents of which are incorporated by reference herein in their entirety.

BACKGROUND OF THE INVENTION

1. Field of the Invention

The present invention relates to a user interface, and particularly, to a method for providing a user interface based on multiple displays and a mobile terminal using the same.

2. Background of the Invention

In general, a terminal may be classified into a mobile (portable) terminal and a stationary terminal according to a moveable state. The mobile terminal may be also classified into a handheld terminal and a vehicle mount terminal according to a user's carriage method.

As functions of the terminal become more diversified, the terminal can support more complicated functions such as capturing images or video, reproducing music or video files, playing games, receiving broadcast signals, and the like. By comprehensively and collectively implementing such functions, the mobile terminal may be embodied in the form of a multimedia player or device.

Various attempts have been made to implement complicated functions in such a multimedia device by means of hardware or software.

The conventional mobile terminal is being evolved to have various designs so as to provide a new and interesting user interface (UI) or user experience (UX). Especially, a mobile terminal having a transparent display thereon is being presented on the market.

A transparent screen is a display apparatus which is in a transparent state like a glass at ordinary time, and capable of visually displaying a graphic object by using a transparent electronic device. A transparent thin film transistor (TTFT) is a representative example of the transparent electronic device, which is applied to a driving circuit such as a transparent display, an active matrix organic light emitting diode (AMOLED) display, and a flexible display.

The conventional mobile terminal having a transparent display thereon has attracted users' interests due to upgraded designs. However, the conventional art has not proposed a concrete method for providing a more convenient and exciting UI or UX to a user by using characteristics of the transparent display.

SUMMARY OF THE INVENTION

Therefore, an object of the present invention is to provide a method for providing a user interface capable of performing conversions, syntheses or displays with respect to contents displayed on screens in a various manner by using a plurality of display units, or capable of manipulating graphic objects on the screens, and a mobile terminal using the same.

To achieve these and other advantages and in accordance with the purpose of the present invention, as embodied and broadly described herein, there is provided a method for providing a user interface of a mobile terminal, the method comprising: controlling transparency of a first display unit; controlling the first display unit to display a first screen; controlling a second display unit to display a second screen; and controlling the second display unit to display one or more parts of the first screen.

According to another embodiment of the present invention, there is provided a method for providing a user interface of a mobile terminal, the method comprising: controlling transparency of a first display unit; controlling the first display unit to display a first screen; controlling a second display unit to display a second screen; and selecting a graphic object positioned on the first screen or the second screen in correspondence to a touch input on the first display unit.

According to still another embodiment of the present invention, there is provided a method for providing a user interface of a mobile terminal, the method comprising: determining a first screen and a second screen relevant to the first screen; controlling transparency of a first display unit; controlling the first display unit to display the first screen; and controlling a second display unit to display the second screen.

To achieve these and other advantages and in accordance with the purpose of the present invention, as embodied and broadly described herein, there is also provided a mobile terminal, comprising: a first display unit having transparency and configured to display a first screen; a second display unit configured to display a second screen in an overlapped state with the first display unit; and a controller configured to control transparency of the first display unit, and to control the second display unit to display one or more parts of the first screen.

According to another embodiment of the present invention, there is provided a mobile terminal, comprising: a first display unit having transparency and configured to display a first screen; a second display unit configured to display a second screen in an overlapped state with the first display unit; and a controller configured to control transparency of the first display unit, and to select a graphic object positioned on the first screen or the second screen in correspondence to a touch input on the first display unit.

According to still another embodiment of the present invention, there is provided a mobile terminal, comprising: a first display unit having transparency and configured to display a first screen; a second display unit configured to display a second screen in an overlapped state with the first display unit; and a controller configured to control transparency of the first display unit, and to determine the first screen and the second screen relevant to the first screen.

In the method for providing a user interface and the mobile terminal using the same according to the present invention, conversions, syntheses or displays with respect to contents displayed on screens may be performed in a various manner by using a plurality of display units, or capable of providing a more convenient and interesting user interface or user experience to a user by manipulating graphic objects.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

For the sake of brief description with reference to the drawings, the same or equivalent components will be provided with the same reference numbers, and description thereof will not be repeated.

Hereinafter, a mobile terminal according to the present invention will be explained in more detail with reference to the attached drawings The suffixes attached to components of the mobile terminal, such as 'module' and 'unit or portion' were used for facilitation of the detailed description of the present invention. Therefore, the suffixes do not have different meanings from each other.

Overall Configuration of Mobile Terminal

The mobile terminal may be implemented in various types. For instance, the mobile terminal in the present description may include a portable phone, a smart phone, a notebook computer, a digital broadcasting terminal, Personal Digital Assistants (PDA), Portable Multimedia Player (PMP), a navigation system, etc. However, it is obvious to those skilled in the art that the embodiment of the present invention may be also applied to a stationary terminal such as a digital TV and a desktop computer.

Figure 1:
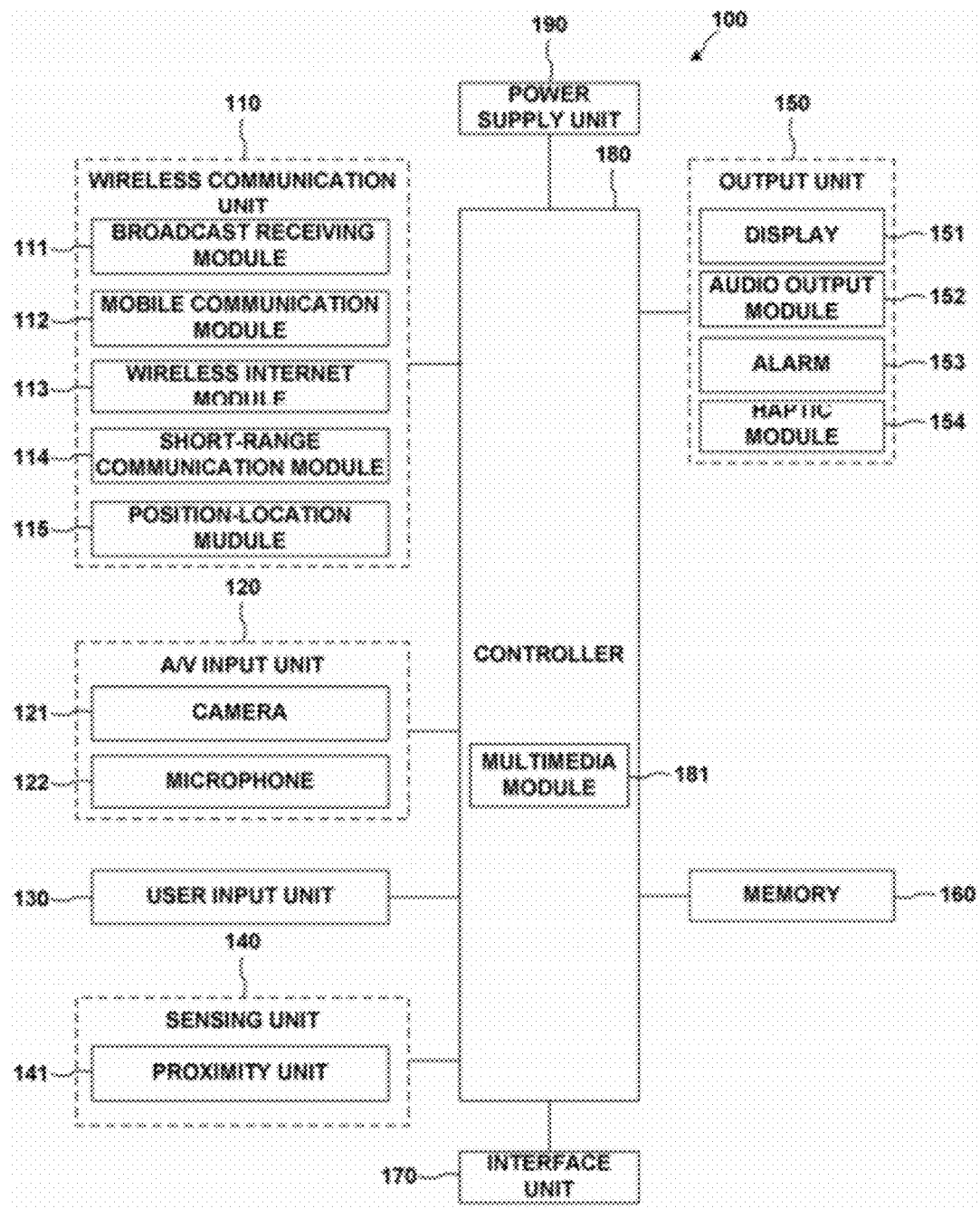
FIG. 1 is a block diagram of a mobile terminal according to one embodiment of the present invention.

FIG. 1 is a block diagram of a mobile terminal according to one embodiment of the present invention.

As shown in FIG. 1, the mobile terminal 100 includes a wireless communication unit 110, an A/V (Audio/Video) input unit 120, a user input unit 130, a sensing unit 140, an output unit 150, a memory 160, an interface unit 170, a controller 180, and a power supply unit 190. FIG. 1 shows the mobile terminal 100 having various components, but it is understood that implementing all of the illustrated components is not a requirement. The mobile terminal 100 may be implemented by greater or fewer components.

The wireless communication unit 110 typically includes one or more components allowing radio communication between the mobile terminal 100 and a wireless communication system or a network in which the mobile terminal is located. For example, the wireless communication unit 110 may include at least one of a broadcast receiving module 111, a mobile communication module 112, a wireless Internet module 113, a short-range communication module 114, a location information module 115, etc.

The broadcast receiving module 111 receives broadcast signals and/or broadcast associated information from an external broadcast management server (or other network entity) via a broadcast channel. The broadcast associated information may refer to information associated with a broadcast channel, a broadcast program or a broadcast service provider. The broadcast associated information may also be provided via a mobile communication network and, in this case, the broadcast associated information may be received by the mobile communication module 112. The broadcast signal may exist in various forms.

The mobile communication module 112 transmits and/or receives radio signals to and/or from at least one of a base station, an external terminal and a server. Such radio signals may include a voice call signal, a video call signal or various types of data according to text and/or multimedia message transmission and/or reception. The wireless Internet module 113 supports wireless Internet access for the mobile terminal. This module may be internally or externally coupled to the mobile terminal 100. Here, as the wireless Internet technique, a wireless local area network (WLAN), Wi-Fi, wireless broadband (WiBro), world interoperability for microwave access (WiMAX), high speed downlink packet access (HSDPA), and the like, may be used.

The short-range communication module 114 is a module for supporting short range communications. Some examples of short-range communication technology include Bluetooth™, Radio Frequency IDentification (RFID), Infrared Data Association (IrDA), Ultra-WideBand (UWB), ZigBee™, and the like.

The location information module 115 is a module for checking or acquiring a location (or position) of the mobile terminal (when the mobile terminal is located in a vehicle, the location of the vehicle can be checked). For example, the location information module 115 may include a GPS (Global positioning system) module that receives location information from a plurality of satellites.

The A/V input unit 120 is configured to receive an audio or video signal. The NV input unit 120 may include a camera 121 (or other image capture device) and a microphone 122 (or other sound pick-up device). The camera 121 processes image data of still pictures or video acquired by an image capture device in a video capturing mode or an image capturing mode. The processed image frames may be displayed on a display unit 151.

The image frames processed by the camera 121 may be stored in the memory 160 (or other storage medium) or transmitted via the wireless communication unit 110. Two or more cameras 121 may be provided according to the configuration of the mobile terminal.

The microphone 122 may receive sounds (audible data) via a microphone (or the like) in a phone call mode, a recording mode, a voice recognition mode, and the like, and can process such sounds into audio data. The processed audio (voice) data may be converted for output into a format transmittable to a mobile communication base station (or other network entity) via the mobile communication module 112 in case of the phone call mode. The microphone 122 may implement various types of noise canceling (or suppression) algorithms to cancel (or suppress) noise or interference generated in the course of receiving and transmitting audio signals.

The user input unit 130 may generate key input data from commands entered by a user to control various operations of the mobile terminal. The user input unit 130 allows the user to enter various types of information, and may include a keypad, a dome switch, a touch pad (e.g., a touch sensitive member that detects changes in resistance, pressure, capacitance, etc. due to being contacted) a jog wheel, a jog switch, and the like.

The sensing unit 140 detects a current status (or state) of the mobile terminal 100 such as an opened or closed state of the mobile terminal 100, a location of the mobile terminal 100, the presence or absence of user contact with the mobile terminal 100 (e.g., touch inputs), the orientation of the mobile terminal 100, an acceleration or deceleration movement and direction of the mobile terminal 100, etc., and generates commands or signals for controlling the operation of the mobile terminal 100. For example, when the mobile terminal 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 is configured to provide outputs in a visual, audible, and/or tactile manner (e.g., audio signal, video signal, alarm signal, vibration signal, etc.). The output unit 150 may include the display unit 151, an audio output module 152, an alarm unit 153, a haptic module 154, and the like.

The display unit 151 may display information processed in the mobile terminal 100. For example, when the mobile terminal 100 is in a phone call mode, the display unit 151 may display a User Interface (UI) or a Graphic User Interface (GUI) associated with a call or other communication. When the mobile terminal 100 is in a video call mode or image capturing mode, the display unit 151 may display a captured image and/or received image, a UI or GUI that shows videos or images and functions related thereto, and the like.

The display unit 151 may include at least one of a Liquid Crystal Display (LCD), a Thin Film Transistor-LCD (TFT-LCD), an Organic Light Emitting Diode (OLED) display, a flexible display, a three-dimensional (3D) display, and an e-ink display.

In some implementations, a display of the display unit 151 is configured to be transparent or light-transmissive to allow viewing of the exterior. A transparent display may be, for example, a TOLED (Transparent Organic Light Emitting Diode) display. Through such configuration, the user can view an object positioned at the rear side of the terminal body through the region occupied by the display unit 151 of the terminal body.

The mobile terminal 100 may include two or more display units 151 according to an implementation method thereof. For example, the mobile terminal 100 may include a plurality of display units integrally or separately disposed on one surface, or a plurality of display units disposed on different surfaces.

Meanwhile, when a sensor (referred to as a 'touch sensor', hereinafter) for detecting a touch operation of the display unit 151 is overlaid in a layered manner (referred to as a 'touch screen'), the display unit 151 may function as both an input device and an output device. The touch sensor may have, for example, the form of a touch film, a touch sheet, a touch pad, and the like.

The touch sensor may be configured to convert the pressure applied to a particular portion of the display unit 151 or a change in capacitance generated at a particular portion of the display unit 151 into an electrical input signal. The touch sensor may be configured to detect a touch input pressure as well as a touch input location and a touch input area.

When there is a touch input with respect to the touch sensor, the corresponding signal(s) are sent to a touch controller. The touch controller processes the signal(s) and transmits corresponding data to the controller 180. Accordingly, the controller 180 can recognize a touched region of the display unit 151.

The proximity sensor 141 may be may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

The audio output module 152 may convert and output as sound audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function performed by the mobile terminal 100 (e.g., a call signal reception sound, a message reception sound, etc.). The audio output module 152 may include a receiver, a speaker, a buzzer, etc.

The alarm unit 153 may provide outputs to inform about the occurrence of an event of the mobile terminal 100. Typical events may include call reception, message reception, key signal inputs, a touch input, etc. In addition to audio or video outputs, the alarm unit 153 may provide outputs in a different manner to inform about the occurrence of an event. For example, the alarm unit 153 may provide an output in the form of vibrations (or other tactile or sensible outputs). When a call, a message, or some other incoming communication is received, the alarm unit 153 may provide tactile outputs (e.g., vibrations) to inform the user thereof. By providing such tactile outputs, the user can recognize the occurrence of various events. Outputs informing about the occurrence of an event may be also provided via the display unit 151 or the audio output module 152.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store programs used for the processing and controlling operations performed by the controller 180, or may temporarily store data (e.g., a phonebook, messages, still images, video, etc.) that is inputted or outputted. The memory 160 may store data relating to various types of vibrations and sounds outputted when touch input is performed on the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

The interface unit 170 may be used to receive inputs (e.g., data, information, power, etc.) from an external device and transfer the received inputs to one or more elements within the mobile terminal 100 or may be used to transfer data between the mobile terminal and an external device.

When the mobile terminal 100 is connected with an external cradle, the interface unit 170 may serve as a conduit to allow power from the cradle to be supplied therethrough to the mobile terminal 100 or may serve as a conduit to allow various command signals inputted from the cradle to be transferred to the mobile terminal therethrough. Various command signals or power inputted from the cradle may operate as signals for recognizing when the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images.

The power supply unit 190 receives external power or internal power and supplies appropriate power required for operating respective elements and components under control of the controller 180.

Processes described herein may be implemented in a computer-readable or its similar medium using, for example, software, hardware, or any combination thereof.

For hardware implementation, the processes may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electronic units designed to perform the functions described herein. In some cases, such processes may be implemented by the controller 180 itself.

For software implementation, the processes, such as procedures or functions, may be implemented together with separate software modules that allow performing of at least one function or operation. Software codes can be implemented by a software application (or program) written in any suitable programming language. The software codes may be stored in the memory 160 and executed by the controller 180.

Method for Processing User Input to Mobil Terminal

The user input unit 130 may generate input data inputted by a user to control the operation of the mobile terminal 100, and include a plurality of manipulation units. The plurality of manipulation units may be referred to as a manipulating portion. The manipulating portion may be operated by a user in any tactile manner.

Various types of visible information may be displayed on the display unit 151. Such information may be displayed in several forms, such as character, number, symbol, graphic, icon or the like.

For input of the information, at least one of characters, numbers, graphics or icons may be arranged and displayed in a preset configuration, thus being implemented in the form of a keypad. Such keypad may be called 'soft key.'

The display unit 151 may be operated as a single entire region or by being divided into a plurality of regions. For the latter, the plurality of regions may cooperate with one another.

For example, an output window and an input window may be displayed at upper and lower portions of the display unit 151, respectively. Soft keys representing numbers for inputting telephone numbers or the like may be output on the input window. When a soft key is touched, a number or the like corresponding to the touched soft key is output on the output window. Upon manipulating the manipulation unit, a call connection for a telephone number displayed on the output window is attempted or a text displayed on the output window may be input to an application.

The display unit 151 or a touch pad may be configured to receive a touch input given in a scrolling manner. A user may thus scroll the display unit 151 or the touch pad to move a cursor or a pointer located on an object, for example, an icon displayed on the display unit 151. In addition, upon moving a finger on the display unit 151 or the touch pad, a movement path of the finger may be visibly displayed on the display unit 151, which may be useful for edition of an image displayed on the display unit 151.

In response to a case where the display unit 151 (touch screen) and the touch pad are touched within a preset period of time, one function of the terminal may be executed. The case of being touched together may include a case of a user clamping a terminal body with his thumb and index finger. The one function may be activation or deactivation of the display unit 151 or the touch pad.

Hereinafter, description will be given of embodiments relating to a control method, which may be implemented in the mobile terminal having such configuration, with reference to the accompanying drawings. The embodiments to be explained later may be implemented independently or by combination thereof. Also, the embodiments to be explained later may be used in combination with the aforesaid user interface (UI).

Method for Providing User Interface Based on Multiple Displays and Mobile Terminal Using the Same In the method for providing a user interface and the mobile terminal using the same according to the present invention, conversions, syntheses or displays with respect to contents displayed on screens may be performed in a various manner by using a plurality of display units, or capable of providing a more convenient and interesting user interface or user experience to a user by manipulating graphic objects.

The conventional various methods for providing a user interface using screen divisions may be applied to the method for providing a user interface according to the present invention through proper modifications. That is, each divided screen in the conventional method for providing a user interface may correspond to a first display unit and a second display unit of a mobile terminal according to one embodiment of the present invention.

More concretely, in the method for providing a user interface according to the present invention, screen conversions, screen syntheses or screen displays may be performed in a various manner by using a plurality of display units including one or more transparent display units, and a more convenient and interesting user interface or user experience may be provided to a user by selecting graphic objects. For instance, the mobile terminal 100 according to one embodiment of the present invention may comprise one transparent display unit and one opaque display unit, or two transparent display units.

The display units may be individually controlled by additional device drivers or control codes, or may be integrally controlled by one device driver or control code. When the display units are individually controlled by additional device drivers or control codes, the device drivers or control codes may be executed by being interworked with other device drivers or control codes at a kernel level.

It is assumed that the mobile terminal 100 comprises a first display unit, a transparent front display unit and a second display unit, a transparent rear display unit, and the first and second display units are implemented as touch screens. However, it should be noted that the present invention is not limited to the above assumption that the mobile terminal 100 comprises the two display units. More concretely, the mobile terminal 100 may comprise three or more display units, and only one of the first and second display units may be implemented as a touch screen. Here, only the first display unit may have transparency, and the mobile terminal may comprise a first display unit, a transparent rear display unit and a second display unit, a transparent front display unit. In this case, various embodiments to be explained later may be executed through modifications by those skilled in the art.

Each function in various embodiments to be later explained may be performed by a preset button input, touch input (single touch, double touch, long touch, strong pressure touch, etc.), gesture input, motion input, menu selection, function selection, icon selection, etc., or through combinations thereof. Accordingly, a 'user input' should be interpreted as one of the above various inputs, selections, or combinations unless it is mentioned in a different manner.

Each function in various embodiments may be activated or deactivated by a user's selection, or a user's input or a user's setting. The first and second display units may display the same screen, or different screens. This may be performed by a user's preset input.

Hereinafter, the operation or function of the mobile terminal 100 according to one embodiment of the present invention will be explained separately according to types of the mobile terminal including two display units, screen conversions using two display units, screen syntheses using two display units, graphic object selections using two display units, and screen displays using two display units. Firstly, types of the mobile terminal including two display units will be explained in more details.

Types of Mobile Terminal Having Two Display Units

Figure 2:
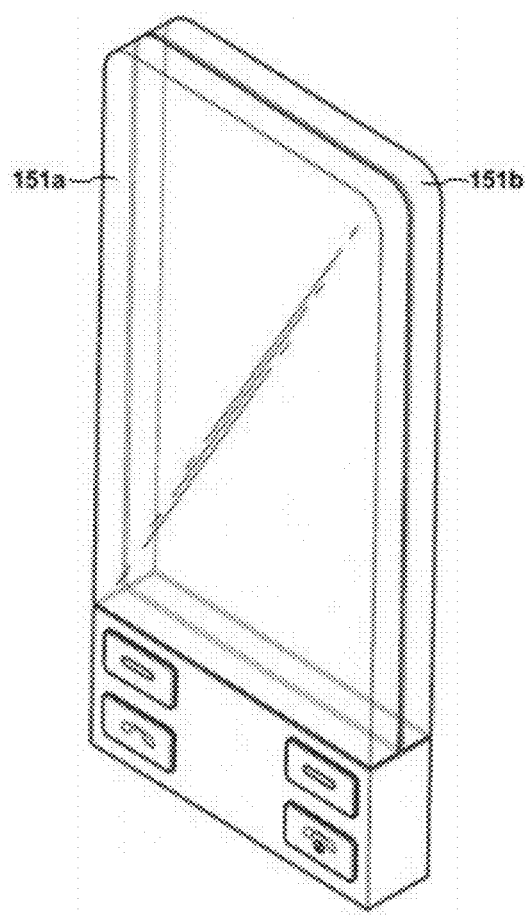
FIG. 2 is a perspective view of a bar-type mobile terminal having two display units according to one embodiment of the present invention.

FIG. 2 is a perspective view of a bar-type mobile terminal having two display units according to one embodiment of the present invention.

As shown in FIG. 2, the bar-type mobile terminal 100 may comprise a first display unit 151a and a second display unit 151b. The first display unit 151a arranged on a front surface of the mobile terminal 100, and the second display unit 151b arranged on a rear surface of the mobile terminal 100 may display a first screen and a second screen, respectively in an overlapped state with each other. Here, only the first display unit 151a may be transparent, or both of the first display unit 151a and the second display unit 151b may be transparent.

Figure 3:
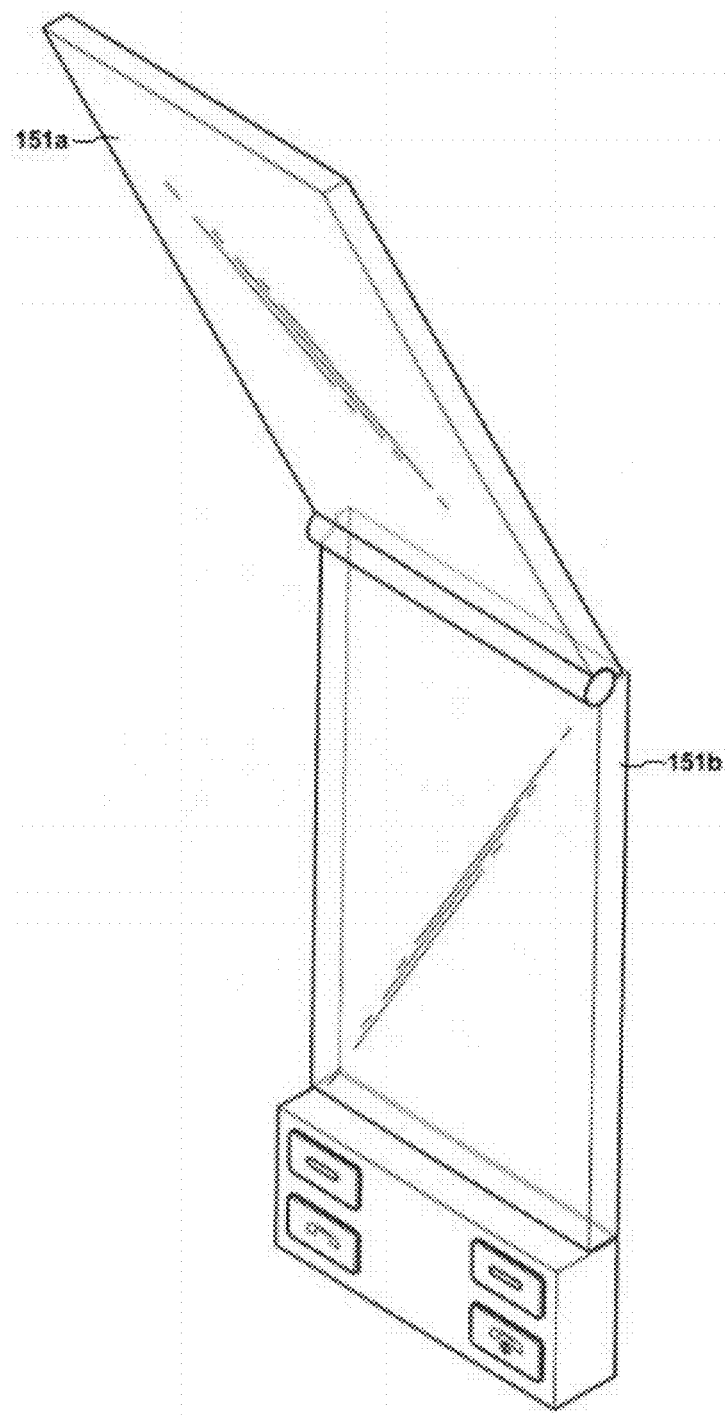
FIG. 3 is a perspective view of a folder-type mobile terminal having two display units according to one embodiment of the present invention.

FIG. 3 is a perspective view of a folder-type mobile terminal having two display units according to one embodiment of the present invention.

As shown in FIG. 3, the folder-type mobile terminal 100 may comprise a first display unit 151a and a second display unit 151b. The first display unit 151a arranged on a front surface of the mobile terminal 100, and the second display unit 151b arranged on a rear surface of the mobile terminal 100 may be connected to each other by a hinge so as to perform a relative motion with respect to each other. The first display unit 151a may perform a relative rotation in a non-overlapped state with the second display unit 151b. Here, only the first display unit 151a may be transparent, or both of the first display unit 151a and the second display unit 151b may be transparent.

Figure 4:
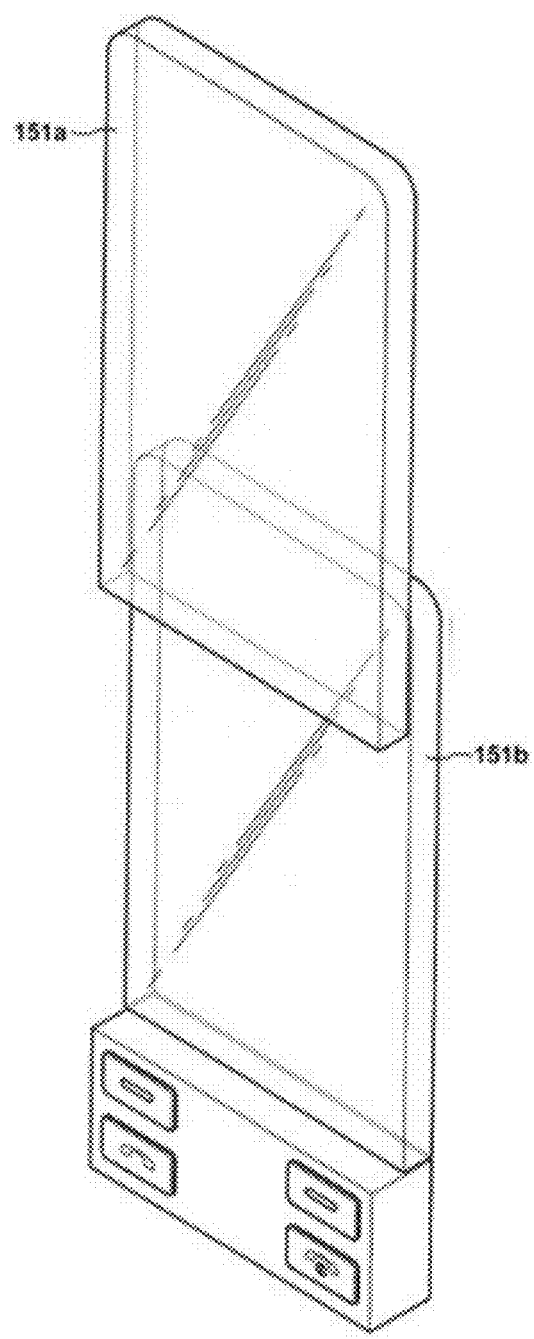
FIG. 4 is a perspective view of a slider-type mobile terminal having two display units according to one embodiment of the present invention.

FIG. 4 is a perspective view of a slider-type mobile terminal having two display units according to one embodiment of the present invention.

As shown in FIG. 4, the slider-type mobile terminal 100 may comprise a first display unit 151a and a second display unit 151b. The first display unit 151a arranged on a front surface of the mobile terminal 100, and the second display unit 151b arranged on a rear surface of the mobile terminal 100 may be connected to each other by a sliding rail (not shown) so as to perform a relative motion with respect to each other. The first display unit 151a may perform a relative sliding in a non-overlapped state with the second display unit 151b. Here, only the first display unit 151a may be transparent, or both of the first display unit 151a and the second display unit 151b may be transparent.

Figure 5:
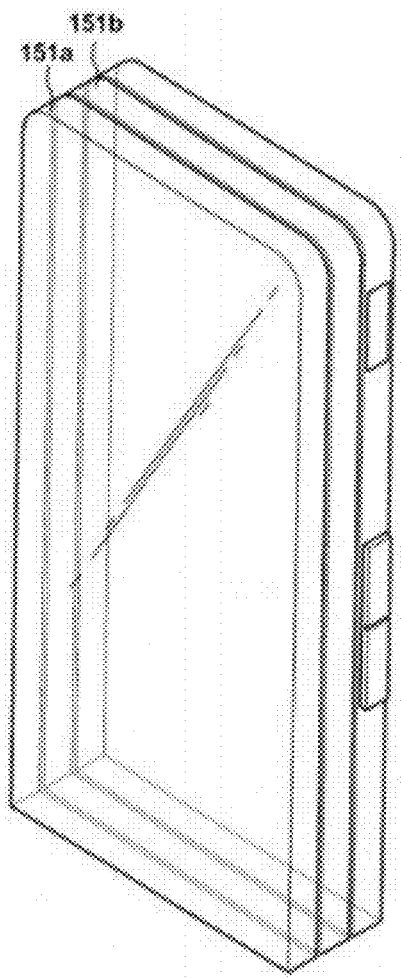
FIG. 5 is a perspective view of a mobile terminal having two display units and an upper-lower layered structure according to one embodiment of the present invention.

FIG. 5 is a perspective view of a mobile terminal having two display units and an upper-lower layered structure according to one embodiment of the present invention.

As shown in FIG. 5, the mobile terminal 100 may comprise a first display unit 151a arranged on a front surface thereof, a body arranged on a rear surface thereof, and a second display unit 151b overlapped with the first display unit 151a between the first display unit 151a and the body.

Here, only the first display unit 151a may be transparent, or both of the first display unit 151a and the second display unit 151b may be transparent. The controller 180 may control transparency (light emitting degree, brightness) by controlling the amount of a current supplied to a transparent electronic device of the transparent display unit. Generally, the transparent display unit becomes more transparent as the current amount is decreased by the controller 180.

The second display unit 151b shown in FIGS. 2 to 5 may have a layered structure with an electronic paper (E-Paper) panel. For instance, the rear display unit 151b may be implemented as a transparent display circuit is mounted on an electronic ink (E-Ink) panel.

Next, screen conversion using two display units will be explained in more details.

Screen Conversions Using Two Display Units

The mobile terminal 100 according to one embodiment of the present invention may convert screens or contents displayed on the first display unit 151a and the second display unit 151b according to a user's preset input or setting.

More concretely, the mobile terminal 100 may display screens of the first display unit 151a and the second display unit 151b in a switching manner. That is, the first display unit 151a may display contents displayed on the second display unit 151b, whereas the second display unit 151b may display contents displayed on the first display unit 151a. Here, the screens may be entire screens or partial screens.

Figure 6:
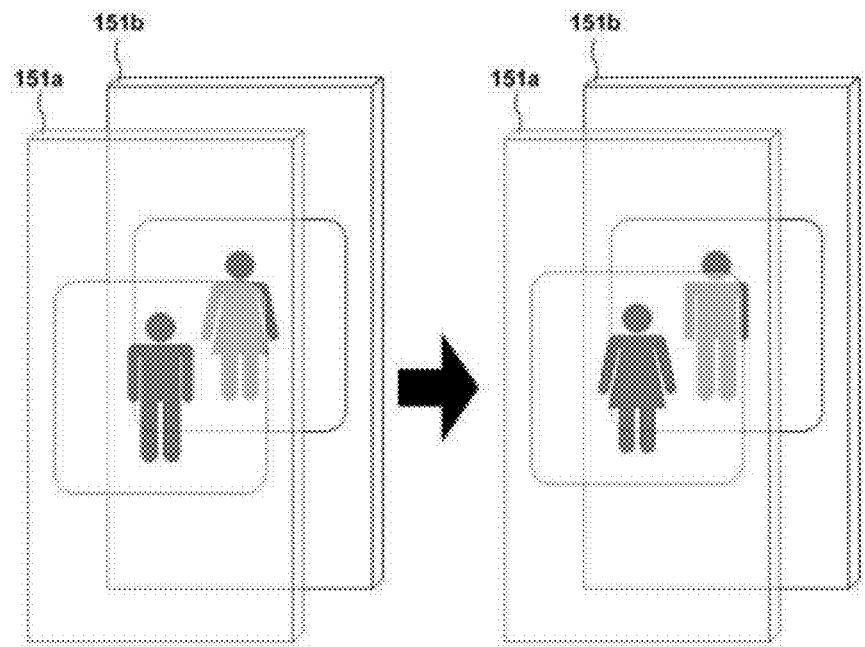
FIG. 6 is an exemplary view showing that a mobile terminal according to one embodiment of the present invention exchanges a screen of a first display unit 151a with a screen of a second display unit 151b.

FIG. 6 is an exemplary view showing that the mobile terminal according to one embodiment of the present invention entirely exchanges the screen of the first display unit 151a with the screen of the second display unit 151b.

As shown in FIG. 6, the first display unit 151a may display a man icon, whereas the second display unit 151b may display a woman icon. The first display unit 151a may be in an overlapped or non-overlapped state with the second display unit 151b (overlapped state in FIG. 6). Referring to FIG. 6, the first display unit 151a displays the screen of the second display unit 151b in a transmissive manner by having a controlled transparency.

The controller 180 may control the second display unit 151b to display one or more parts of the first screen, or may control the first display unit 151a to display one or more parts of the second screen. For instance, the controller 180 may display the screen of the second display unit 151b on the first display unit 151a in the form of PIP (picture in picture) or divided screens according to a user's input. Once a user has edited the screen displayed on the first display unit 151a in the form of picture in picture (PIP), the mobile terminal 100 may display the edited screen on the second display unit 151b.

Figure 7:
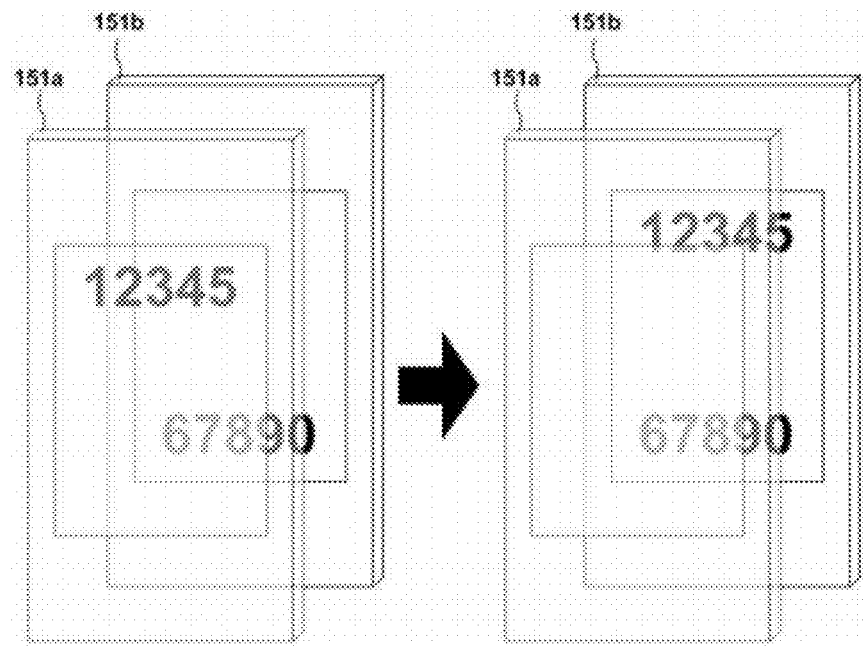
FIG. 7 is an exemplary view showing that a mobile terminal according to one embodiment of the present invention moves contents displayed on a first display unit 151a onto a second display unit 151b.

FIG. 7 is an exemplary view showing that the mobile terminal according to one embodiment of the present invention moves contents displayed on the first display unit 151a to the second display unit 151b, and displays the contents on the second display unit 151b.

As shown in FIG. 7, contents displayed on the first display unit 151a may be moved to be displayed on the second display unit 151b. On the contrary, although not shown, the contents displayed on the second display unit 151b may be displayed on the first display unit 151a. Here, the contents may include all types of visual contents displayed on the screen, such as characters, numbers, symbols, icons, images, moving images, and UI components (buttons, menus, etc.).

For screen conversion, a user may press a screen conversion button, or may touch a screen conversion key on a virtual keypad. Alternatively, the user may perform double touch (click), long touch, or touch using a high pressure (hereinafter, will be referred to as 'high pressure touch') on the display unit. Whether high pressure touch has been input or not may be determined by checking whether a capacitance has been increased in case of a capacitive touch screen, or by checking touched duration or a pressure value in case of a static pressure type touch screen.

For screen conversion, the user may perform a simultaneous touch at a symmetrical point between the first display unit 151a and the second display unit 151b having a layered structure with respect to each other. That is, in a state that the mobile terminal 100 has been held by the user, the user may downward touch the first display unit 151a (touch screen) while upward touching the second display unit 151b (touch screen) at a symmetrical point therebetween.

For screen conversion, the user may also shake the mobile terminal 100 in upper and lower directions or in right and left directions.

The controller 180 may activate or deactivate the aforementioned screen conversion function by a user's input or setting. This will be explained in an assumption that the mobile terminal 100 executes a document viewing application.

In a case that the screen conversion function has been activated, the first display unit 151a may display a current page, and the second display unit 151b may display a previous or next page of a page being currently edited. If the first display unit 151a displays the previous or next page according to a user's input, the second display unit 151b displays a previous or next page of the page displayed on the first display unit 151a.

In a case that the screen conversion function has been deactivated, only a page displayed on the first display unit 151a may be changed according to a user's input in a state that a page displayed on the second display unit 151b is fixed. This method may be similarly applied to a case where the first and second display units display an internet page to which an internet browser has accessed.

Next, screen synthesis using two display units will be explained in more details.

Screen Syntheses Using Two Display Units

The mobile terminal 100 according to one embodiment of the present invention may synthesize screens or contents displayed on the first display unit 151a and the second display unit 151b according to a user's preset input or setting.

More concretely, the mobile terminal 100 may combine, or overlap, or overlay the screens or contents of the first and second display units 151a and 151b with each other. Alternatively, the mobile terminal 100 may generate a new screen or contents from the screens or contents of the two display units by utilizing computer graphic effects when performing the combination or overlap (overlay) process.

More concretely, the first display unit 151a may display a first screen, and the second display unit 151b may display a second screen in an overlapped or non-overlapped state with the first display unit 151a. The controller 180 may control transparency of at least one of the first display unit 151a and the second display unit 151b. Under control of the controller 180, a screen may be generated through a synthesis process between one or more parts of the first screen and one or more parts of the second screen, and the first display unit 151a or the second display unit 151b may display the generated screen.

The controller 180 may display a first layer of an image on the first display unit 151a, and may display a second layer of the image on the second display unit 151b. The controller 180 may combine the first and second layers with each other by various layer synthesis (blending) methods supported by general graphic edition tools. The controller 180 may store a synthesized or combined result image in the memory 160, or may display the result image on the first display unit 151a or the second display unit 151b.

For instance, the controller 180 may synthesize the first and second layers with each other by controlling transparency of the first or second layer. Here, the controller 180 may directly change transparency of the layer by changing a pixel data value of the first or second layer. As aforementioned, the controller 180 may generate visual effects for controlling transparency of the first or second layer by controlling transparency of the first display unit 151a or the second display unit 151b.

In the latter case, once a user has selected a button for storing or displaying a final result image, the controller 180 may change a substantial pixel data value of the first or second layer by reflecting transparency of the first display unit 151a or the second display unit 151b. In case of implementing a layer synthesis by physically controlling characteristics of the display screens, processing resources of pixel data required at the time of a layer synthesis may be reduced.

The controller 180 may mix a color of the first layer with a color of the second layer, and then display the mixed color. Alternatively, the controller 180 may synthesize a foreground of the first layer with a background of the second layer, and then display the synthesized result image.

Figure 8:
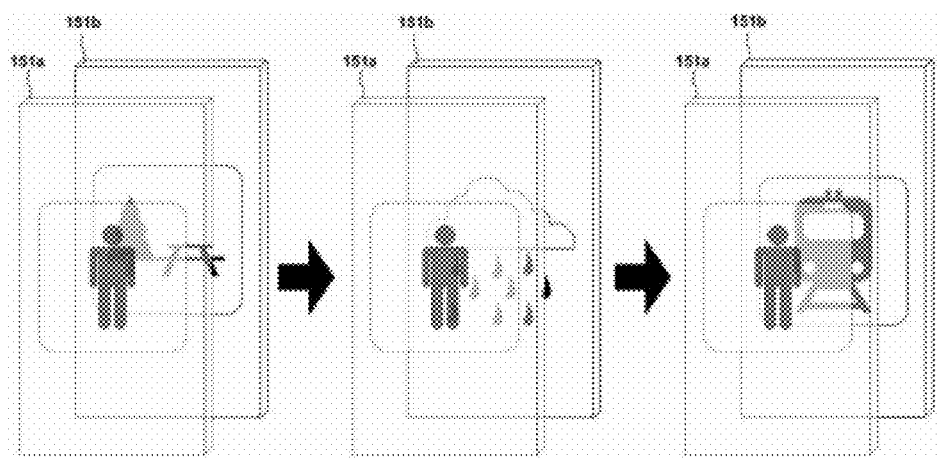
FIG. 8 is an exemplary view showing that a mobile terminal according to one embodiment of the present invention synthesizes a screen of a first display unit 151a with a screen of a second display unit 151b.

FIG. 8 is an exemplary view showing that the mobile terminal according to one embodiment of the present invention synthesizes the screen of the first display unit 151a with the screen of the second display unit 151b.

As shown in FIG. 8, the first display unit 151a may display a first layer of an image, whereas the second display unit 151b may display a second layer of the image. The first layer (foreground screen) displayed on the first display unit 151a may be maintained, whereas the second layer (background screen) displayed on the second display unit 151b may be replaced. Accordingly, a result image obtained by synthesizing various backgrounds with the same foreground may be displayed.

Transparency of the first display unit 151a or the second display unit 151b may be controlled by user's various inputs. For instance, in correspondence to a user's operation to up-down scroll or up-down drag a predetermined region on a screen (e.g., left region or right region), the controller 180 may control transparency of the first display unit 151a or the second display unit 151b. That is, a user may control each transparency of the first display unit 151a and the second display unit 151b by merely using his or her thumb and index finger with holding the mobile terminal 100.

The controller 180 may activate or deactivate the aforementioned screen synthesis function by a user's input or setting. Next, graphic object manipulations on two display units will be explained in more details.

Graphic Object Manipulations on Two Display Units

The mobile terminal 100 according to one embodiment of the present invention may select a graphic object displayed on the first display unit 151a or the second display unit 151b, or move (or copy) the graphic object to another display unit, or interwork the graphic object with a graphic object displayed on another display unit, according to a user's preset input.

Here, the graphic object indicates all types of objects that can be visually displayed on the screen, such as texts, icons, images, moving images, and UI components (buttons, menus, etc.).

The interworking between graphic objects means that a first graphic object is visually combined or synthesized with a second graphic object, or means that an object represented by a first graphic object is connected to an object represented by a second graphic object. Here, the object represented by the graphic object means all types of data or electronic files such as an e-mail, a schedule, an address, a task, a document, a text and a binary file. The connection between objects means that a first object is moved (copied) to a second object, or means that the first object is synthesized or combined with the second object, or means that the second object executes the first object or is operated based on the first object.

More concretely, the mobile terminal 100 may select a graphic object displayed on the first display unit 151a or the second display unit 151b in correspondence to a touch input on the first display unit 151a or the second display unit 151b. Especially, the mobile terminal 100 may select a graphic object displayed on the second display unit 151b in correspondence to a touch input on the first display unit 151a. On the contrary, the mobile terminal 100 may select a graphic object displayed on the first display unit 151*a* in correspondence to a touch input on the second display unit 151*b*.

More concretely, the first display unit 151*a* may display a first screen, and the second display unit 151*b* may display a second screen in an overlapped or non-overlapped state with the first display unit 151*a*. The controller 180 may control transparency of at least one of the first display unit 151*a* and the second display unit 151*b*. The controller 180 may select a graphic object displayed on the first or second display unit in correspondence to a touch input on the first display unit 151*a* or the second display unit 151*b*.

Figure 9:
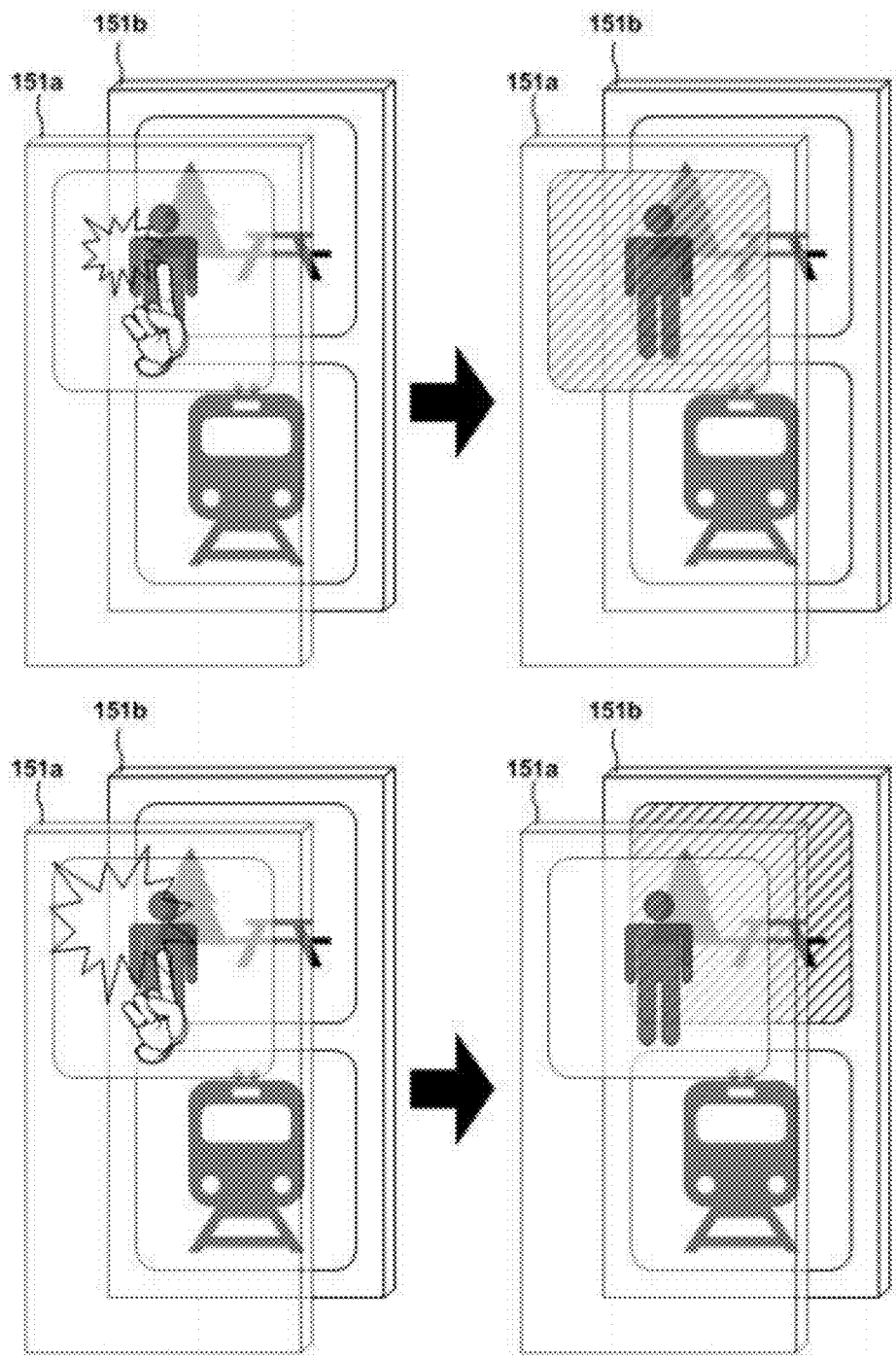
FIG. 9 is an exemplary view showing that a mobile terminal according to one embodiment of the present invention selects or moves a graphic object in correspondence to a touch input on a display unit.

FIG. 9 is an exemplary view showing that the mobile terminal according to one embodiment of the present invention selects or moves a graphic object in correspondence to a touch input on the display unit.

As shown in FIG. 9, the first display unit 151*a* and the second display unit 151*b* are overlapped with each other in a state that the first display unit 151*a* is positioned at an upper side and the second display unit 151*b* is positioned at a lower side, and a graphic object is on each corresponding position of the first display unit 151*a* and the second display unit 151*b*. In this case, a graphic object displayed on the first display unit 151*a* may be selected in correspondence to a short touch on the position, whereas a graphic object displayed on the second display unit 151*b* may be selected in correspondence to a long touch on the position.

Figure 10:
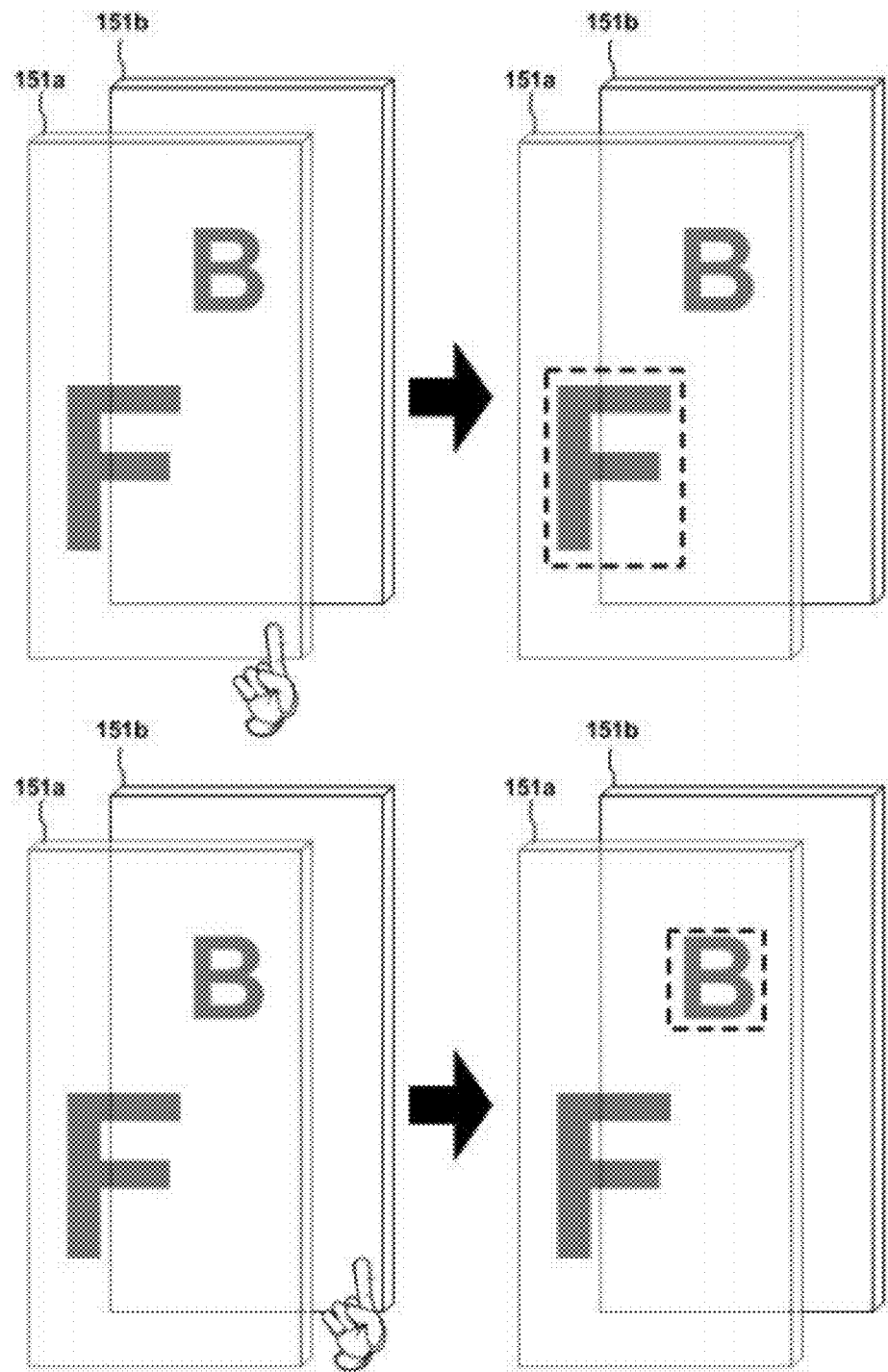
FIG. 10 is an exemplary view showing that a mobile terminal according to one embodiment of the present invention selects a three-dimensional graphic object in correspondence to a touch input on a display unit.

FIG. 10 is an exemplary view showing that the mobile terminal according to one embodiment of the present invention selects a three-dimensional graphic object in correspondence to a touch input on the display unit.

As shown in FIG. 10, when a graphic object has 3-dimensional depth information by being captured or generated in the form of a three-dimensional image, a graphic object ('F' in FIG. 10) having a deep depth (located at a front side) may be firstly selected with respect to touch input on the first display unit 151*a*. On the contrary, a graphic object ('B' in FIG. 10) having a shallow depth (located at a rear side) may be firstly selected with respect to touch input on the second display unit 151*b*.

The controller 180 may select one or more graphic objects displayed on the first display unit 151*a*, and may interwork the selected graphic object with a position, a folder or an application on the second display unit 151*b*.

Figure 11:
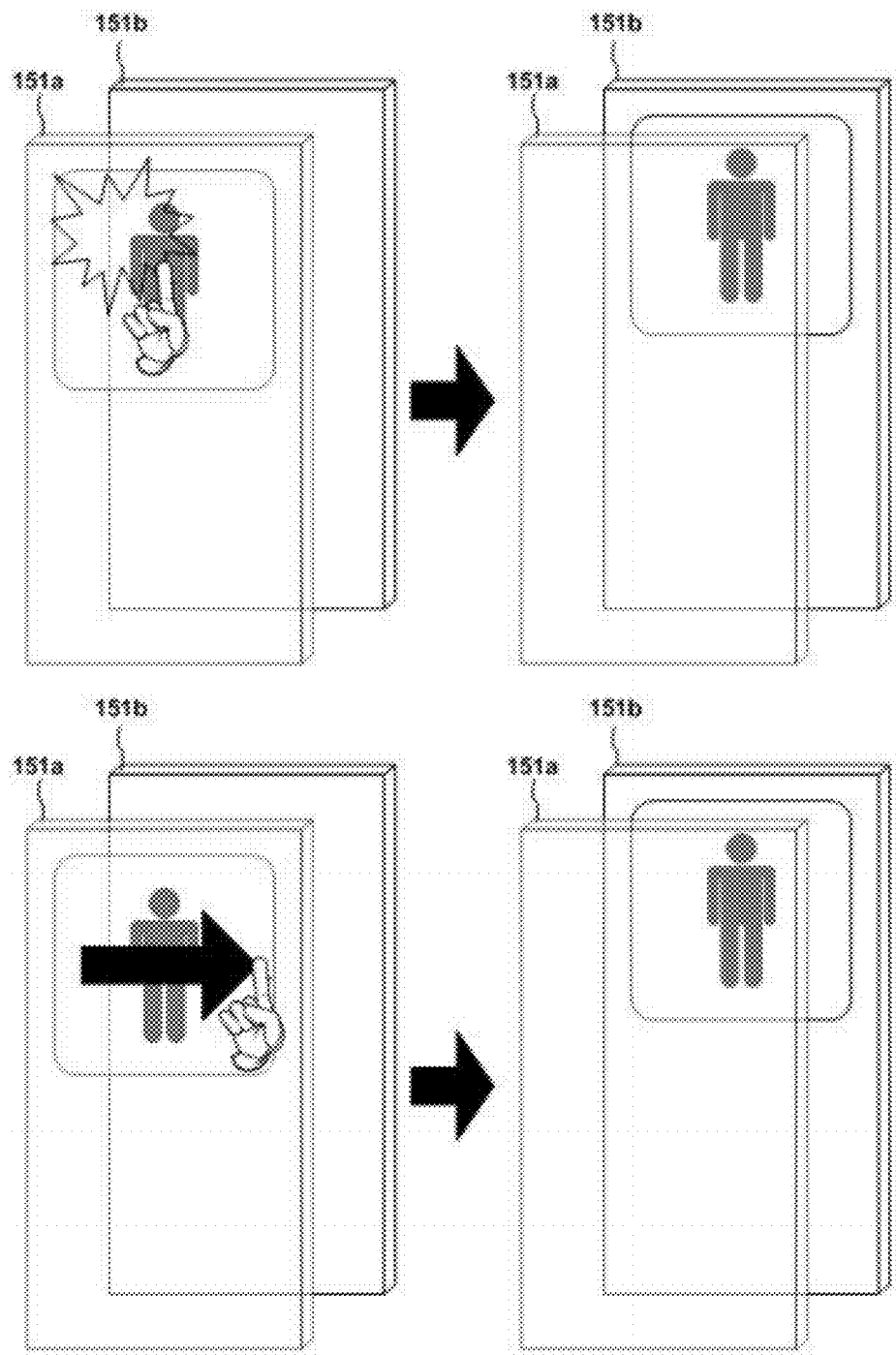
FIG. 11 is an exemplary view showing that a mobile terminal according to one embodiment of the present invention moves a graphic object in correspondence to a touch input on a display unit.

FIG. 11 is an exemplary view showing that the mobile terminal according to one embodiment of the present invention moves a graphic object in correspondence to a touch input on the display unit.

As shown in FIG. 11, an icon or a file displayed on the first display unit 151*a* may be moved (or copied) to a folder displayed on the second display unit 151*b* by a long touch or a high pressure touch. Once a user has flicked a graphic object displayed on the first display unit 151*a*, the graphic object may be moved to be displayed on the second display unit 151*b*.

The controller 180 may set a screen of the first display unit 151*a* and a screen of the second display unit 151*b* as one screen. That is, if a pointer or a graphic object is moved out of edges of the screen of the first display unit 151*a*, the pointer or the graphic object may be displayed on the second display unit 151*b*. When the first display unit 151*a* and the second display unit 151*b* are in a non-overlapped state (e.g., an unfolded state by being relatively-rotated or relatively-slid), the aforementioned configuration may allow the screen to be extended much more.

The controller 180 may activate or deactivate the aforementioned graphic object selection function by a user's input or setting. Next, screen display using two display units will be explained in more details.

Screen Displays Using Two Display Units

The mobile terminal 100 according to one embodiment of the present invention may display a screen or a graphic object on the first display unit 151*a* and the second display unit 151*b* in a various manner and through various combinations, according to a user's preset input or setting.

More concretely, the first display unit 151*a* may display a first screen, and the second display unit 151*b* may display a second screen in an overlapped or non-overlapped state with the first display unit 151*a*. The controller 180 may control transparency of at least one of the first display unit 151*a* and the second display unit 151*b*. The controller 180 may determine the first screen and the second screen relevant to the first screen.

Here, the first screen may be the same as the second screen, or may be different from the second screen. The first and second screens may display contents relevant to each other, or may display contents irrelevant to each other.

Figure 12:
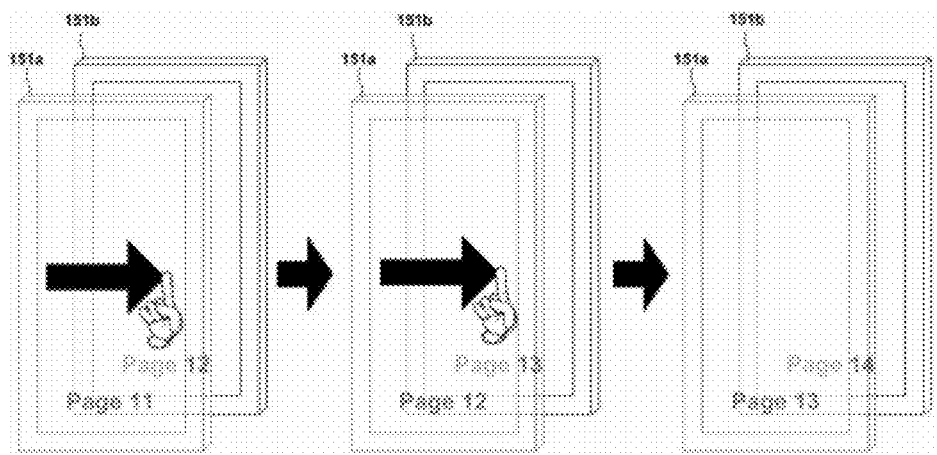
FIG. 12 is an exemplary view showing that a mobile terminal according to one embodiment of the present invention displays relevant contents on two display units.

FIG. 12 is an exemplary view showing that the mobile terminal according to one embodiment of the present invention displays relevant contents on two display units.

As shown in FIG. 12, in a case that the mobile terminal 100 executes a document viewing application, the first display unit 151*a* and the second display unit 151*b* may respectively display the next page whenever a user performs a flicking operation on the first display unit 151*a*.

Although not shown in FIG. 12, while an internet browser is being executed, the first display unit 151*a* and the second display unit 151*b* may respectively display a current internet page and a previous internet page. When the internet browser is operated in a multi-tap browsing manner, the first display unit 151*a* and the second display unit 151*b* may display internet pages irrelevant to each other.

More concretely, the controller 180 may change a screen displayed on the second display unit 151*b* in correspondence to an input on the first display unit 151*a*, or an input relevant to a screen of the first display unit 151*a*, and vice versa.

The controller 180 may control the first display unit 151*a* so as to display a mirror image of the original screen. And, the controller 180 may control transparency of the second display unit 151*b* such that a mirror image displayed on the first display unit 151*a* can be viewed through the second display unit 151*b*.

Figure 13:
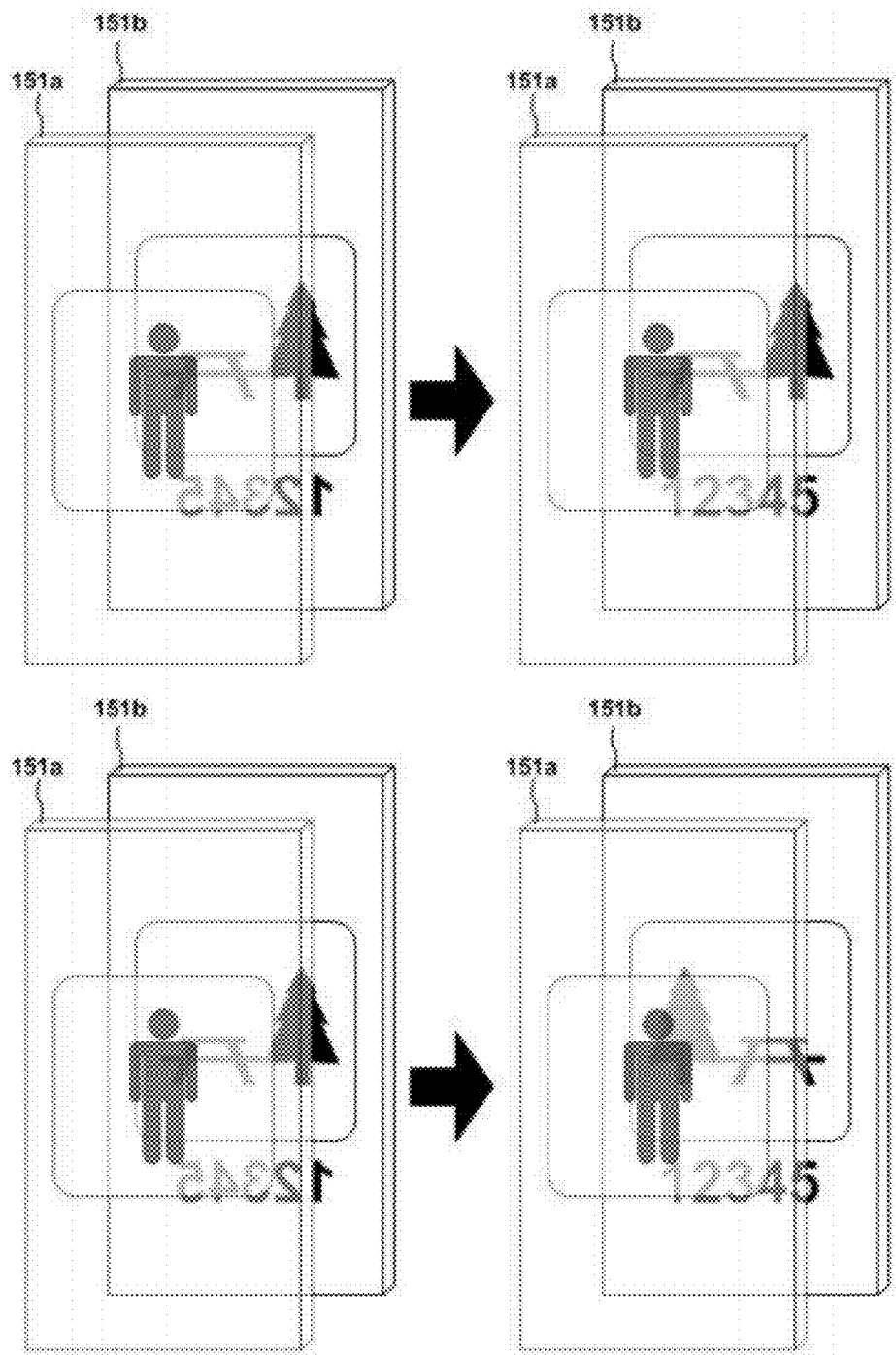
FIG. 13 is an exemplary view showing that a mobile terminal according to one embodiment of the present invention displays a mirror image of a screen of a display unit.

FIG. 13 is an exemplary view showing that the mobile terminal according to one embodiment of the present invention displays a mirror image of a screen of the display unit.

As shown in FIG. 13, when the first display unit 151*a* and the second display unit 151*b* are in an overlapped state with each other, the first display unit 151*a* and the second display unit 151*b* may display screens so that the screens can be seen from outside in opposite directions. In order to allow a user to view the screen of the first display unit 151*a* or the second display unit 151*b* from one direction by using transparency, the second display unit 151*b* located at a rear side based on a user's viewpoint may display a mirror image of the original screen. That is, the second display unit 151*b* may display only texts (characters, numbers, symbols, etc., refer to the upper end of FIG. 13) while maintaining other graphic objects. Alternatively, the second display unit 151*b* may display a mirror image of the entire graphic objects including texts (refer to the lower end of FIG. 13).

The controller 180 may display, on the second display unit 151b, contents relevant to contents displayed on the first display unit 151a in the aspect of time, and vice versa.

For instance, while an internet browser is being executed, the controller 180 may display a current internet page on the first display unit 151a, and may display, on the second display unit 151b, a page accessed before or after the current internet page.

While a document viewing application or a document editing application is being executed, the controller 180 may display a current page on the first display unit 151a, and may display a previous page or a next page on the second display unit 151b.

While an image editing application is being executed, the controller 180 may display an image after correction on the first display unit 151a, and may display an image before correction on the second display unit 151b.

The controller 180 may display, on the second display unit 151b, contents relevant to contents displayed on the first display unit 151a in the aspect of spatial enlargement or contraction, and vice versa.

For instance, while a map application is being executed, the controller 180 may display a map screen on the first display unit 151a, and may display, on the second display unit 151b, an enlargement or contraction screen with respect to a central portion of the map screen or a user's selection point. Once a user has selected a specific point on the map screen displayed on the first display unit 151a, the controller 180 may display an enlargement screen with respect to the selected specific point on the first display unit 151a, and may display the map screen on the second display unit 151b.

Furthermore, the controller 180 may display, on the second display unit 151b, contents displayed on the first display unit 151a, or user interface components (e.g., function buttons, menus, virtual keypad, etc.) for changing the contents, and vice versa.

For instance, the controller 180 may display, on the first display unit 151a, a preview screen being currently captured by a camera 121, and may display, on the second display unit 151b, a menu screen for changing a capturing setting. Alternatively, the controller 180 may display an image being currently edited on the first display unit 151a, and may display an edition setting menu, an edition function menu, etc. on the second display unit 151b.

The controller 180 may display, on the second display unit 151b, detailed information or additional information of contents displayed on the first display unit 151a, and vice versa.

For instance, while an internet browser is being executed, the controller 180 may display a current internet page on the first display unit 151a, and may display, on the second display unit 151b, a page accessed according to a link included in a current site. Once a user has performed a flicking operation on the first display unit 151a, the controller 180 displays the screen displayed on the second display unit 151b on the first display unit 151a. This may enhance a screen conversion speed.

Alternatively, while an internet browser is being executed, the controller 180 may display a current internet page on the first display unit 151a, and may display, on the second display unit 151b, relevant search words with respect to a main word displayed on the current internet page. Once a user has selected a specific relevant search word, the controller 180 may display, on the second display unit 151b, internet search results with respect to the selected relevant search word.

Alternatively, while a text message application is being executed, the controller 180 may display a received text message on the second display unit 151b, and may display, on the first display unit 151a, a screen for writing a reply text message with respect to the received text message.

The controller 180 may display, on the second display unit 151b, contents to be combined or interworked with contents displayed on the first display unit 151a, and vice versa.

For instance, when the first display unit 151a and the second display unit 151b are in an overlapped state with each together, the controller 180 may set the first display unit 151a to be transparent so that the screen of the second display unit 151b can be viewed. At the same time, the controller 180 may display, on the first display unit 151a, a screen for writing memos (texts, images, diagrams, etc.) with respect to contents displayed on the second display unit 151b. Written memos may be included in contents displayed on the second display unit, or may be additionally stored. Alternatively, the written memos may be displayed or may not be displayed according to a user's input.

The second display unit 151b may include an electronic paper (E-Paper) display, or may have an up-down layer structure together with an electronic paper display. In this case, the first display unit 151a having a controlled transparency or light emitting degree may serve as a front light with respect to the second display unit.

The controller 180 may display, on the second display unit 151b, a list including items similar or equal to contents displayed on the first display unit 151a, and vice versa.

For instance, the controller 180 may display a message input screen on the first display unit 151a, and may display, on the second display unit 151b, a reception message list in various manners such as a thumbnail manner, a scroll manner, and a screen division manner. As aforementioned, the screen or contents displayed on the first display unit 151a may be exchanged from the screen or contents displayed on the second display unit 151b.

In an assumption that a graphic object is captured or generated in the form of a three-dimensional image or a multi-viewpoint image, the controller 180 may display a front side of the graphic object on the first display unit 151a, and may display a rear side of the graphic object on the second display unit 151b. For instance, with respect to a figure photo generated in the form of a multi-viewpoint image including a front side and a rear side of a figure (person), the controller 180 may display the front side of the figure on the first display unit 151a, and may display the rear side of the figure on the second display unit 151b overlapped with the first display unit 151a. This may allow a user to view the entire figure through the first display unit 151a and the second display unit 151b in an alternating manner.

The controller 180 may activate or deactivate the aforementioned various screen display functions according to a user's input or setting. Next, Concrete Embodiments using the aforementioned functions of screen conversions, screen syntheses, graphic object selections, screen displays will be explained in more details.

Concrete Embodiment:Message Writing

The first display unit 151a or the second display unit 151b may display an icon for a message writing application. When the first display unit 151a displays an icon for a message writing application, a user may perform a message writing application by touching the icon on the first display unit 151a. When the second display unit 151b displays an icon for a message writing application, a user may perform a message writing application by performing a short touch (or low pressure touch) with respect to the icon on the second display unit 151b. Alternatively, the user may perform a message writing application through a long touch (or high pressure touch) with respect to the icon on the first display unit 151a.

Figure 14:
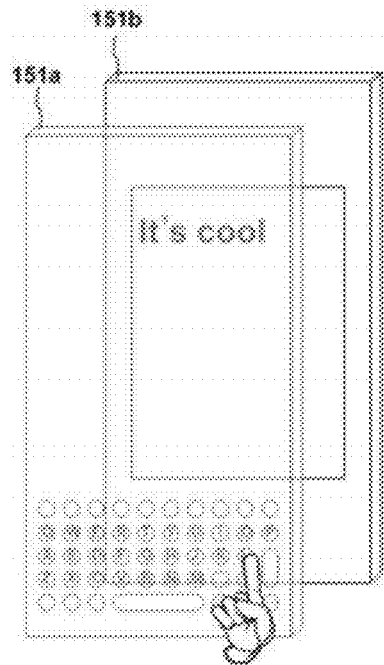
FIG. 14 is an exemplary view showing that a mobile terminal according to one embodiment of the present invention displays a message writing screen and a virtual keypad.

FIG. 14 is an exemplary view showing that the mobile terminal according to one embodiment of the present invention displays a message writing screen and a virtual keypad.

As shown in FIG. 14, the first display unit 151a may display a virtual keypad (e.g., qwerty type keypad) for message input, and the second display unit 151b may display an inputted message. Here, the first display unit 151a may display a virtual keypad only when a touch input has occurred, or for a predetermined time after a touch input has occurred. In a case that the first and second display units 151a and 151b are connected to each other as a folder type in which first and second bodies can perform a relative rotation, an unfolded display unit may display a virtual keypad.

A virtual keypad may be transparently displayed by controlling transparency of the first display unit 151a. Alternatively, a message may be entirely or partially (the rest messages except for a line being currently written) displayed with a transparent state by controlling transparency of the second display unit 151b. A screen of the first display unit 151a and a screen of the second display unit 151b may be exchanged with each other according to a user's preset input.

Figure 15:
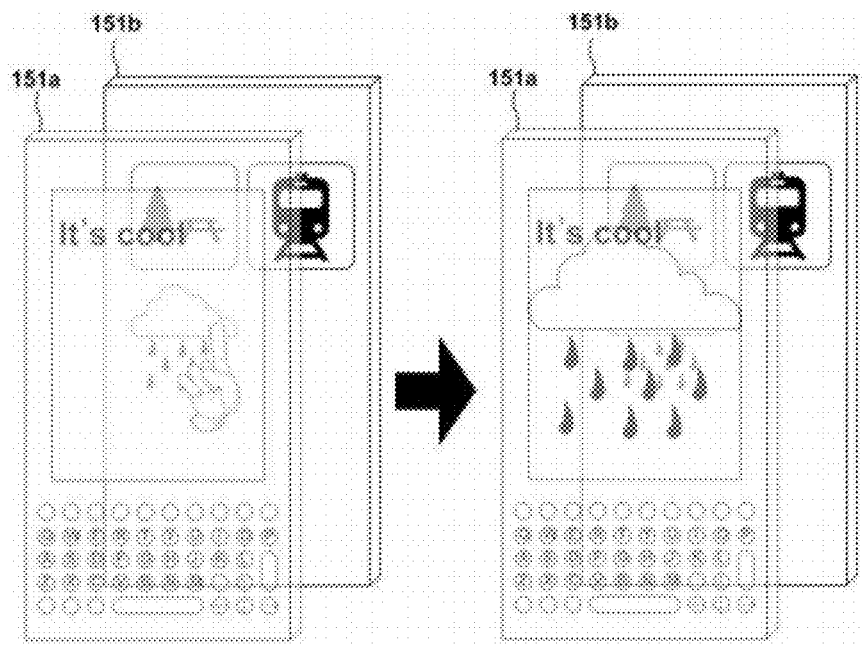
FIG. 15 is an exemplary view showing that a mobile terminal according to one embodiment of the present invention displays a message writing screen.

FIG. 15 is an exemplary view showing that the mobile terminal according to one embodiment of the present invention displays a message writing screen.

As shown in FIG. 15, the first display unit 151a may display message input contents and a virtual keypad, and the second display unit 151b may display, in a thumbnail manner, a list of background images, files, photos, moving images, picture cards, music, etc. which can be added to a message.

Although not shown in FIG. 15, the controller 180 may generate one background image (background image defined by a user), in a layer edition manner, from a plurality of background images, photos, picture cards, texts, etc. In this case, the first and second display unit may display stated before and after an edition. Alternatively, the first display unit 151a or the second display unit 151b may display states before and after an edition in the form of divided screens. The controller 180 may control only a specific layer to be displayed by controlling transparency of the first display unit 151a or the second display unit 151b.

The first display unit 151a may display a message input screen and/or a virtual keypad, and the second display unit 151b may display other function menus or other applications (e.g., e-mail client application, SNS application, talk application, etc.). The application displayed on the second display unit 151b may be executed according to a touch input, a gesture input, etc. on the second display unit 151b.

Once a user has touched texts, photos, images, pictures or moving images displayed on the first display unit 151a in a predetermined manner (e.g., high pressure touch, long touch, double touch, etc.), the touched items may be inserted into message input contents displayed on the second display unit 151b.

Concrete Embodiment:Real-Time Messenger

Figure 16:
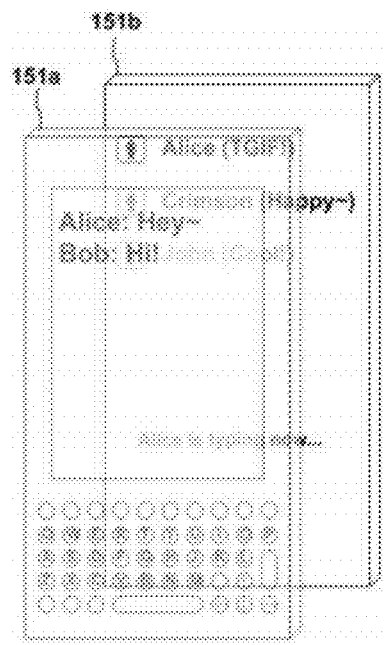
FIG. 16 is an exemplary view showing that a mobile terminal according to one embodiment of the present invention displays a real-time messenger conversation screen and additional information.

FIG. 16 is an exemplary view showing that the mobile terminal according to one embodiment of the present invention displays a real-time messenger conversation screen and additional information.

As shown in FIG. 16, the first display unit 151a may display conversation contents, and the second display unit 151b may display whether another party has inputted a message, a list of conversation parties who are in an online state, etc. Although not shown in FIG. 16, the second display unit 151b may display another party's profile, another party's state information, whether a message has been transmitted or not, a message reception state, etc.

Once a specific conversion party displayed on the second display unit 151b is selected (touched), conversions with the selected party may be attempted. As aforementioned, the screen of the first display unit 151a and the screen of the second display unit 151b may be exchanged with each other according to a user's preset input.

The first display unit 151a may display transmission message contents, and the second display unit 151b may display reception message contents. The controller 180 may control a message conversation screen displayed on the first display unit 151a to be displayed on the second display unit 151b. And, the controller 180 may control the messenger conversation screen displayed on the second display unit 151b not to be viewed by lowering transparency of the first display unit 151a.

Concrete Embodiment:Address Book

Figure 17:
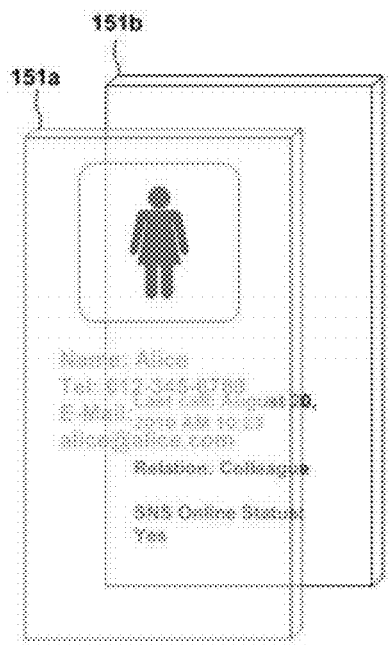
FIG. 17 is an exemplary view showing that a mobile terminal according to one embodiment of the present invention displays an address book screen.

FIG. 17 is an exemplary view showing that the mobile terminal according to one embodiment of the present invention displays an address book screen.

As shown in FIG. 17, the first display unit 151a may display basic information of an object selected or searched by a user from an address book, and the second display unit 151b may display other information of the selected object. Here, the basic information may include a name, a phone number, an e-mail address, a memo, a messenger ID, a photo, etc. Said other information may include a call history, a call frequency, a relationship with a user, an SNS interworking state with a user, etc. Once a user has selected an item on other information, the first display unit 151a or the second display unit 151b may display detailed information of the corresponding item.

Although not shown in FIG. 17, the second display unit 151b may display objects frequently selected or searched from an address book, in an alignment manner according to a name order, a frequency order, etc., or may display the objects in the form of objects stored in an additional folder.

Concrete Embodiment: Music Playing

Figure 18:
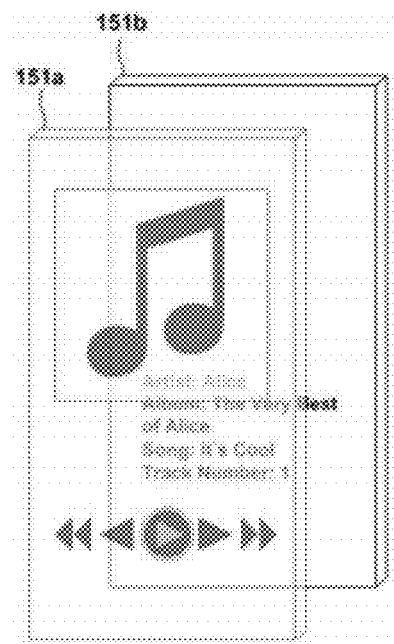
FIG. 18 is an exemplary view showing that a mobile terminal according to one embodiment of the present invention displays a music playing screen.

FIG. 18 is an exemplary view showing that the mobile terminal according to one embodiment of the present invention displays a music playing screen.

As shown in FIG. 18, the first display unit 151a may display function menus such as cover art images, playing, temporary pause, rewinding, fast forwarding, repetition of one music, repetition of all music, and arbitrary playing, and the second display unit 151b may display singer information, music information, album information, photos, lyrics, a popular degree, a recognition degree, etc. with respect to music being currently played.

The first display unit 151a may display basic information (singer information, etc.) of music being currently played, and the second display unit 151b may display basic information of previous music and next music with respect to currently-played music. Once a user has selected (touched) previous or next music on the second display unit 151b, the mobile terminal 100 may play the selected music.

The second display unit 151b may display a menu including a function to control an equalizer (EQ) of currently-played music, a function to correct a play list, a function to set currently-played music into a bell sound, etc.

Here, information, menus, etc. to be displayed on the first display unit 151a and the second display unit 151b may be individually set. Once a user has selected (touched) specific information, a specific menu, etc., the mobile terminal 100 may display detailed information or detailed menus of the selected information on the first display unit 151a or the second display unit 151b.

The mobile terminal 100 may output music displayed on the first display unit 151a to a front speaker, and may output music displayed on the second display unit 151b to a rear speaker. The mobile terminal 100 may control a volume of each music outputted from the front speaker and the rear speaker. This may allow different types of music to be simultaneously outputted, or may allow one type of music to be outputted at a specific time point.

Concrete Embodiment: Map & Traffic Information

Figure 19:
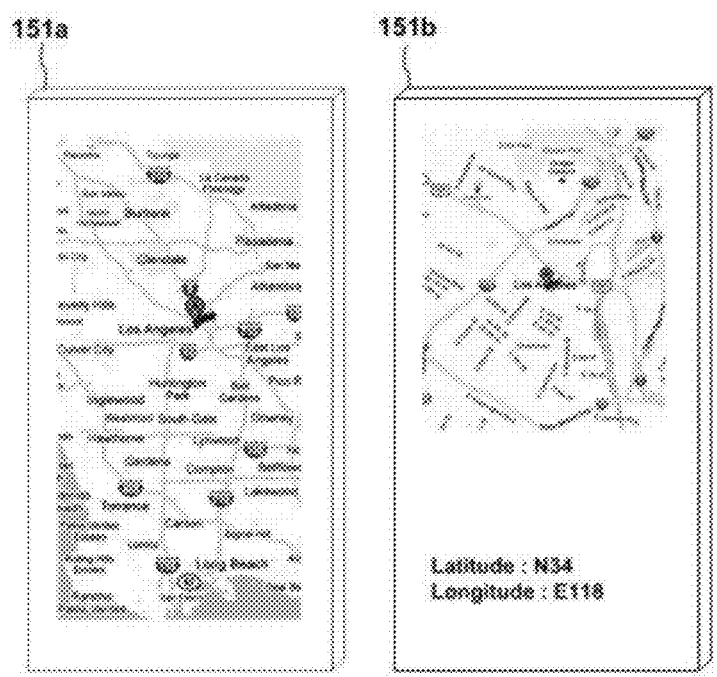
FIG. 19 is an exemplary view showing that a mobile terminal according to one embodiment of the present invention displays a map screen.

FIG. 19 is an exemplary view showing that the mobile terminal according to one embodiment of the present invention displays a map screen.

As shown in FIG. 19, the first display unit 151a may display a map of a position being currently searched or selected by a user, and the second display unit 151b may display a longitude and a latitude of a position selected (touched) by a user from the map displayed on the first display unit, or may display an enlargement map with respect to a selected (touched) position. The mobile terminal 100 may set an enlargement range of a map displayed on the second display unit 151b according to a user's input.

The first display unit 151a may display a map in a general manner, and the second display unit 151b may display route information, tour information (restaurant, gas station, toilet, etc.), etc. of an area displayed on the first display unit 151a. The second display unit 151b may display a satellite map, a contour map, a road view image, etc. with respect to an area displayed on the first display unit 151a.

The first display unit 151a may display traffic information (e.g., starting point traffic information and destination traffic information) with respect to an area searched or selected by a user. And, the second display unit 151b may display a CCTV image of the area, detailed traffic information (e.g., information on locations having traffic jam) of a selected item among the route information, a function setting screen, a location search screen, a traffic information file download screen, etc.

Once a user has selected (touched) specific detailed traffic information displayed on the second display unit 151b, the first display unit 151a may display the selected detailed traffic information on the entire screen, and the second display unit 151b may display contents displayed on the first display unit 151a.

Concrete Embodiment: Game

The mobile terminal 100 may display graphic objects (e.g., icons and images) displayed on the first display unit 151a and the second display unit 151b through position movement according to a user's input, or by moving to another display unit. In this manner, two users may play games reciprocally by using graphic objects displayed on the first display unit 151a and the second display unit 151b.

Once a first user has touches a graphic object displayed on the first display unit 151a, the mobile terminal 100 may display the graphic object on a corresponding point of the second display unit 151b (e.g., the same coordinate point or symmetrical point as/to a corresponding point of the first display unit 151).

Here, the mobile terminal 100 may generate a visual effect that the graphic object is backwardly moved to the second display unit 151b. Likewise, once a user has selected (touched) a specific graphic object on the second display unit 151b, the mobile terminal 100 may generate a visual effect that the graphic object is forwardly moved to the first display unit 151a. Furthermore, the first display unit 151a and the second display unit 151b may enhance the aforementioned visual effects by displaying the graphic objects with a different depth by using a three-dimensional (3D) image display function.

The mobile terminal 100 may set a plurality of graphic objects (e.g., icons and images) displayed on the first and second display units, to have different distances based on a user who is viewing the first display unit 151a. A user may select a graphic object set to have a short distance by touching the first display unit 151a, whereas the user may select a graphic object set to have a long distance by touching the second display unit 151b. As aforementioned, the user may select a graphic object set to have a long distance by performing a long touch or a high pressure touch on the first display unit 151a.

The mobile terminal 100 may display a plurality of graphic objects on the first and second display units in a distributed manner, and may select a graphic object in correspondence to a user's touch input on the first display unit 151a or the second display unit 151b. When the first and second display units can display three-dimensional images, the effect of spatial depth may be enhanced.

Whenever a first user who manipulates the first display unit 151a and a second user who manipulates the second display unit 151b clicks or touches the same graphic object, a front surface and a rear surface of the graphic object may be switched from each other. In this manner, two users can play games by using graphic objects displayed on the first and second display units. For instance, a user who has more switched front and rear surfaces of a graphic object from each other for a predetermined time may be set as a winner.

The first display unit 151a may display a graphic object manipulated by a first user, and the second display unit 151b may display a graphic object manipulated by a second user. The first and second display units may commonly display results obtained by manipulating respective graphic objects by the first and second users. In this manner, two users can play games by using graphic objects displayed on the first and second display units. For instance, each user can play a card game with using his or her own cards in the aforementioned manner.

Concrete Embodiment: Broadcasting

The first display unit 151a may display a broadcasting image (e.g., DMB image) of a selected channel, and the second display unit 151b may display information on goods or products shown on a current broadcasting image. Alternatively, the second display unit 151b may display a purchase service user interface screen for purchasing goods, or may display an access path (URL link) to an online shopping mall for purchasing goods.

The first display unit 151a may display a broadcasting image of a selected channel, and the second display unit 151b may display a preview image of another channel. For instance, the second display unit 151b may display a broadcasting image of a previous channel or a next channel of a selected channel. Once a user has selected (touched) a broadcasting image of another channel displayed on the second display unit 151b, the mobile terminal 100 may display the broadcasting image of the selected channel on the first display unit 151a in a switching manner.

The second display unit 151b may display broadcasting images of a plurality of channels in the form of a thumb nail. Once a user has selected (touched) a broadcasting image of a specific channel, the mobile terminal 100 may display the broadcasting image of the selected channel on the first display unit 151a as an entire screen.

The first display unit 151a may display a broadcasting image on an entire screen. And, the second display unit 151b may display channel information, or may display a user interface component for function setting (e.g., volume control button, channel change arrow icon, etc.). A user may manipulate a setting relating to a broadcasting image displayed on the first display unit 151a by touching the second display unit 151b.

The first display unit 151a may display a broadcasting image of a selected channel, and the second display unit 151b may display a broadcasting reception signal quality (e.g., DMB reception signal strength) according to each area. A user may select a broadcasting viewing place with reference to the quality information.

Concrete Embodiment: Scheduling Management

The first display unit 151a may display monthly schedules in the form of a calendar, and the second display unit 151b may display detailed information (daily schedule, timely schedule, etc.) of the current date (today) or a selected date. When a screen conversion function is performed between the first and second display units, the second display unit 151b may display a plurality of monthly schedules (e.g., schedules of this month, and schedules of previous and next months).

The first display unit 151a may display a screen for inputting detailed contents (e.g., time, place, theme, etc.) with respect to a selected schedule. And, the second display unit 151b may display a UI screen for inserting documents, images, moving images, files, URL links, etc. relating to a corresponding schedule.

The first display unit 151a may real-time display a screen for inputting or correcting a schedule, and the second display unit 151b may display backup histories with respect to contents being currently inputted or corrected on the first display unit 151a. The backup may be performed periodically or by a user's selection, or may be performed when inputs or corrections have occurred by an amount more than a predetermined amount. Once a user has selected (touched) a specific item from the backup histories displayed on the second display unit 151b, the mobile terminal 100 may display contents of the selected item in a backup manner on the first display unit 151a. As a result, the user's inconvenience due to wrong schedule inputs or corrections may be reduced.

Concrete Embodiment: Phone Book

The first display unit 151a or the second display unit 151b may display phone numbers aligned according to a name order, a group order, a phone number order, a call history frequency, etc., phone numbers searched according to a user's input, etc. The mobile terminal 100 may display a screen of the first display unit 151a and a screen of the second display unit 151b in an alignment order. The first or second display unit having a 3D image display function may display a profile photo inputted with respect to a phone number, in a three dimensional manner.

Once a user has selected a plurality of objects from a phone book list displayed on the first and second display units, the mobile terminal 100 may attempt a call with three parties including the selected objects, or a call for phone conference. For instance, the mobile terminal 100 may perform a call with three parties based on objects displayed on the first display unit 151a.

Once a user has selected one or more objects from a phone book list displayed on the first display unit 151a, the mobile terminal 100 may display the selected objects on the second display unit 151b. After object selection has been completed or any call has been performed, the mobile terminal 100 may sequentially attempt call connection to objects included in a list displayed on the second display unit 151b. The first display unit 151a may display object information (objects profile, etc.), the object to whom call connection is being attempted or who is in a call state.

Concrete Embodiment: Social Network Service (SNS)

The first display unit 151a may display an SNS login screen or contents input screen, and the second display unit 151b may display an SNS-related file manager, a folder list, a storage text list, etc. Once a user has selected a file shown on a file manager screen, a text included in a storage text list, etc., the first display unit 151a may input the selected file or text to a contents input screen.

Once a user has selected a specific text displayed on the first display unit 151a, the mobile terminal 100 may display, on the second display unit 151b, not only the text but also a number of a posting including the text, or a page number of a notice board (bulletin board) including the posting. Once the user has selected a text, a posting number or a page number displayed on the second display unit 151b, the mobile terminal 100 may display a corresponding posting or notice board page on the first display unit 151a.

The second display unit 151b may display a list of a plurality of followers or persons having a first relation in the form of a tree, a thumbnail, etc. Once the user has selected a desired object from the second display unit 151b, the first display unit 151a may display an SNS screen of the selected object in a switching manner.

The first display unit 151a and the second display unit 151b may display a plurality of SNS users in an alternating manner according to a user input (e.g., drag) by being interworked with each other as one screen. Here, the plurality of SNS users may be classified according to categories (sections, groups), and the first display unit 151a and the second display unit 151b may display a plurality of categories in an alternating manner.

Concrete Embodiment: Electronic Mail (E-Mail)

The first display unit 151a may display a mail being currently read by a user, and the second display unit 151b may display all mails stored in a folder including the mail in an aligned manner. Once a user has selected a specific mail from the second display unit 151b, the first display unit 151a may display the selected mail.

The first display unit 151a may display a mail writing screen, and the second display unit 151b may display a background screen or an attachment file of a mail being currently written. Upon completion of the mail writing, the mobile terminal 100 may send contents displayed on the first display unit 151a, and the background screen or the attachment file displayed on the second display unit 151b as one mail.

Once a user has selected a part of the contents displayed on the first display unit 151a, the mobile terminal 100 may copy the selected contents to a mail writing screen displayed on the second display unit 151b, and vice versa.

The user may have a plurality of e-mail accounts. In this case, the first display unit 151a may display a plurality of mails by aligning in the order of time, a name, a mail size, a sender, etc. The second display unit 151b may display a list of a plurality of e-mails in the form of a thumbnail, a scroll, screen division, etc., and may display a part of each e-mail account in the form of a preview. Once the user has selected (touched) a specific e-mail account on the second display unit 151b, the first display unit 151a may display mails of the selected e-mail account, and the second display unit 151b may display all mails of a plurality of e-mail accounts.

Concrete Embodiment: Camera

The first display unit 151a may display a function setting UI (e.g., menus, buttons, icons, etc.) with respect to a capturing image, and the second display unit 151b may display a preview screen with respect to a capturing image by the camera 121. In a case that the first display unit 151a displays the function setting UT and the preview screen together, the second display unit 151*b* may enter a screen deactivation mode.

The first display unit 151*a* may display an image before corrections or before image settings (exposure value, photometric method, image effect, etc.) has changed, and the second display 151*b* may display an image after corrections or after image settings has changed. As a result, a user may check changes of a camera image according to changes of image editions or settings.

The first display unit 151*a* may display a preview screen (e.g., user's photo) of a front camera (self capturing camera), and the second display unit 151*b* may real-time display a preview screen (e.g., background photo) of a rear camera. The controller 180 may synthesize an image captured by a front camera and an image captured by a rear camera, and may display the synthesized image on one preview screen. Here, the controller 180 may store the synthesized image. As a result, a user may predict a background image and a synthesized result in a self-capturing mode.

The second display unit 151*b* may display a preview image of an image captured by the camera, and the controller 180 may display, on the first display unit 151*a*, a result searched on the internet with respect to the preview image. Here, the user may set, on the preview image, objects (goods, products, buildings, pictures, sculptures, books, etc.) or regions to be searched. While the first display unit 151*a* displays an image search result, the controller 180 may display, on the second display unit 151*b*, a lower directory of an image search result page or a page of a link included in the image search result page by reading in advance.

The controller 180 may display a plurality of consecutively-captured images on the first and second display units, and may store images selected by a user's input or determined by a predetermined reference (image focusing quality, etc.).

The second display unit 151*b* may display a capturing image, and the first display unit 151*a* may display a memo written with respect to the capturing image. The controller 180 may store the memo together with the capturing image in the form of meta data of the capturing image, or may store the memo and the capturing image separately from each other. In case of displaying a capturing image having a memo stored therein, the controller 180 may display the memo on the first display unit 151*a* or the second display unit 151*b*. The controller 180 may reduce a revelation possibility of the memo displayed on the first display unit 151*a* or the second display unit 151*b*, by controlling transparency of the first display unit 151*a* or the second display unit 151*b*.

Concrete Embodiment: Call

During a call, the second display unit 151*b* may display a call-related function UI (e.g., a phone book, memos, voice memos, etc.), and the first display unit 151*a* may display a call-related information UI, detailed functions/detailed information with respect to a specific function, etc.

The first display unit 151*a* may display call-related information or function UI, and the second display unit 151*b* may display other application (e.g., multimedia application UI, etc.) being executed by multi-tasking. The first display unit 151*a* may display an image of another party during a video call, and the second display unit 151*b* may display a memo inputting screen or a phone book search screen.

Concrete Embodiment: Memo

The first display unit 151*a* may display a text input screen or a picture memo screen, and the second display unit 151*b* may display a UI screen for attaching background screen images, music and moving images. The controller 180 may store background screen images together with inputted texts or photo memos. As a result, when a user selects a written memo, the controller 180 may control the background screen images to be viewed.

The controller 180 may store written texts, picture memos, etc., on the first and second display units in a distribution manner. Once a user has selected a written memo, the first and second display units may respectively display the items stored in a distribution manner. Here, the user may prevent a memo to be entirely exposed to a third party by controlling transparency of one display unit. The user may check memo contents by controlling transparency of the first and second display units, or by overlapping the first and second display units each having controlled transparency with each other in upper and lower directions.

The first display unit 151*a* may display a screen for inputting memos (e.g., function explanations, other contents, etc.) with respect to a graphic object. Once the user has moved a pointer on a graphic object displayed on the second display unit 151*b*, the first display unit 151*a* may display memo contents written with respect to the graphic object.

Concrete Embodiment: Album (Gallery)

In a case that tag or layer information with respect to each photo exists in the form of metadata, the first and second display units may display photos classified according to each tag or each layer. According to a user's input (dragging, flicking, etc.), photos displayed on the second display unit 151*b* may be displayed on the first display unit 151*a*, and photos corresponding to other tag or layer may be displayed on the second display unit 151*b*. The operation may be performed in a reverse manner according to a direction of dragging or flicking.

The first display unit 151*a* may display photos, and the second display unit 151*b* may display an icon of a folder where photos are to be stored. The controller 180 may copy or move photos displayed on the first display unit 151*a* and selected by a user's input, to a folder on the second display unit 151*b*. Once a user has selected (touched) a folder displayed on the second display unit 151*b*, the first display unit 151*a* may display photos stored in the folder.

The first display unit 151*a* may display a plurality of photos stored by being interworked with memos, tags, etc. Once the user has shaken the mobile terminal 100 or has performed a predetermined input, the controller 180 may store the photos in folders displayed on the second display unit 151*b* in a sorted manner according to a similarity of a photo file name, a similarity of a memo text, a similarity of a tag, etc. Here, the controller 180 may set a name of each folder as a name which can represent photos included in the folder. For instance, the controller 180 may set a name of a folder as a first photo file name, the most common text among memo texts, etc.

Concrete Embodiment: Moving Image Playing

The first display unit 151*a* may display a moving image being currently played, and the second display unit 151*b* may display a list of moving images. A user may view the list of moving images on the second display unit by controlling transparency of the first display unit 151*a*.

In a case that the first display unit 151*a* and the second display unit 151*b* have a folding or sliding structure in upper and lower directions, screens of the first and second display units may be unfolded in parallel according to folder opening or sliding opening. Here, the controller 180 may display one moving image on the first and second display units in the form of a wide screen.

The second display unit 151*b* may display a screen of a moving image before edition, and the first display unit 151*a* may display a screen of a moving image after edition. In a case that the first display unit 151*a* and the second display unit 151*b* have a folding or sliding structure in upper and lower directions, a user may easily compare an image before editions with an image after editions by unfolding the first and second display units in parallel.

The first and second display units may display moving image layers #1 and #2, respectively, and the controller 180 may store each layer as an additional moving image. Alternatively, the controller 180 may synthesize the respective layers, and store the synthesized layer as one moving image. In case of layer addition, the first display unit 151*a* may display one moving image layer on an entire screen, and the second display unit 151*b* may display the rest layers on divided screens.

Each of the first and second display units may display one layer. When a user's predetermined input (flipping) is performed, the rest layers not displayed on the first and second display units may be displayed on the first or second display unit by replacing the existing layer (rolling type).

The first display unit 151*a* may play an image of a person or a main object, and the second display unit 151*b* may play an image of a background. The controller 180 may generate a 3D image effect by controlling depths of images displayed on the first and second display units.

The second display unit 151*b* may display a moving image in a general manner, and the first display unit 151*a* may generate various visual effects by displaying the moving image with time delay or by displaying various image effects (e.g., delay effect, etc.).

Alternatively, the first display unit 151*a* may display a moving image in a general manner, and the second display unit 151*b* may display a still (stationary) screen captured by a screen capture function, or may display a plurality of still screens in the form of icons.

Concrete Embodiment: Internet Browser

The first display unit 151*a* may display a current internet page, and the second display unit 151*b* may display a previous page, a link page included in the current page, sub directories, internet usage histories, etc. Contents displayed on the second display unit 151*b* may be set by a user.

Alternatively, the first display unit 151*a* may display a current internet page, and the second display unit 151*b* may display relevant search words of a text on the current internet page, search results (relevant sites, etc.) with respect to the relevant search words, etc.

Alternatively, the first display unit 151*a* may display an internet page, and the second display unit 151*b* may display contents (e.g., moving images, flashes, images, etc.) included or linked in the internet page as an entire screen.

Alternatively, once a user has selected (touched) a specific text of a current page displayed on the first display unit 151*a*, the controller 180 may display dictionary contents with respect to the text, on the second display unit 151*b*, through a dictionary function mounted in the mobile terminal 100 or through dictionary searches on the internet.

Alternatively, the second display unit 151*b* may display an internet page, and the first display unit 151*a* may display a memo input screen with respect to the internet page. The controller 180 may store the internet page and the memo input screen together.

Alternatively, the second display unit 151*b* may display an internet page, and the first display unit 151*a* may display a part of the internet page by enlargement.

Alternatively, the first display unit 151*a* may display an internet page, and the second display unit 151*a* may display a virtual keypad for text input on the internet page. When the second display unit 151*b* is arranged at a predetermined position (e.g., unfolded state) or in a predetermined direction, the controller 180 may display the virtual keypad on the second display unit 151*b*.

In a case that a user adds an internet page displayed on the first display unit 151*a* to a bookmark or stores in the form of HTML, XML, PDF, and images, the second display unit 151*b* may display the added bookmark or the stored internet page in the form of an icon. Once a user has selected (touched) the internet page on the second display unit 151*b*, the first display unit 151*a* may display the existing internet page and the selected internet page in the form of divided screens.

Concrete Embodiment: Search

The first display unit 151*a* may display a list of searched files, contents, etc., and the second display unit 151*b* may display files, contents, etc. selected from the list. The first and second display units may display different files, contents, etc.

Concrete Embodiment: E-Book

The second display unit 151*b* may include an electronic paper (E-Paper) panel (e.g., E-Ink panel), or may be combined therewith. In this case, the controller 180 may display a text on the second display unit 151*b*, and may display color photos, color images, etc. on the first display unit 151*a*.

The controller 180 may recognize photos, images, etc. of an E-book from tags inserted when generating the E-book. The controller 180 may display a text on the second display unit 151*b*, and may display photos, images, etc. on the first display unit 151*a*.

The controller 180 may control transparency of the first display unit 151*a*, and may display, on the first display unit 151*a*, memos with respect to contents displayed on the second display unit 151*b*. The controller 180 may insert memos written on the first display unit, in the contents displayed on the second display unit 151*b*.

The controller 180 may control transparency of the first display unit 151*a*, and may display a bookmark list with respect to contents displayed on the second display unit 151*b* in the form of icons, images, etc. Once a user has selected (touched) a specific bookmark on the first display unit 151*a*, the second display unit 151*b* may display contents corresponding to the selected bookmark.

Figure 20:
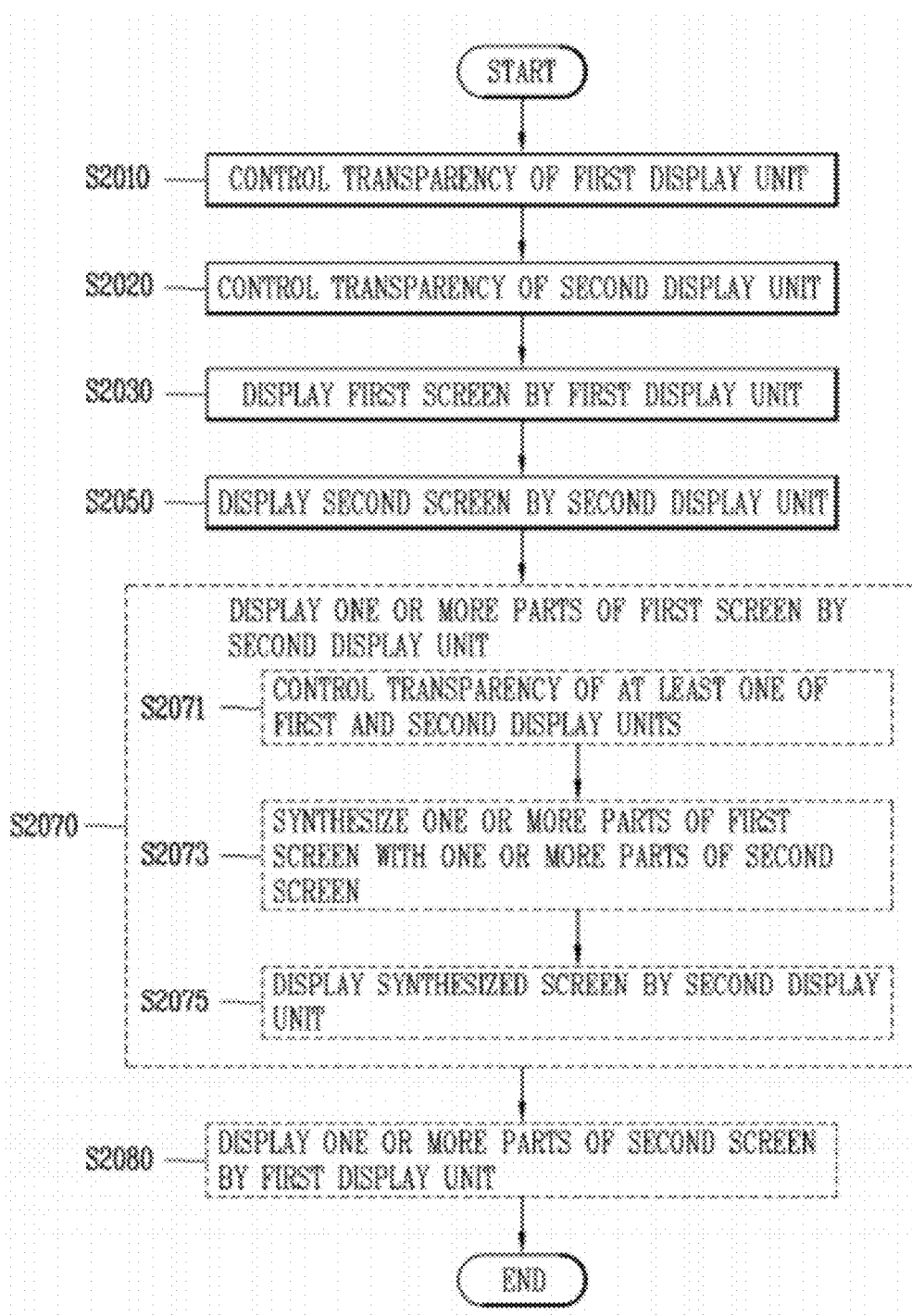
FIG. 20 is a flowchart showing a method for providing a user interface according to one embodiment of the present invention.

FIG. 20 is a flowchart showing a method for providing a user interface according to one embodiment of the present invention.

Referring to FIG. 20, the mobile terminal 100 controls transparency of the first display unit 151*a* (S2010). And, the mobile terminal 100 may also control transparency of the second display unit 151*b* (S2020).

The mobile terminal 100 controls the first display unit 151*a* to display a first screen (S2030). And, the mobile terminal 100 controls the second display unit 151*b* to display a second screen (S2050).

The mobile terminal 100 controls the second display unit 151*b* to display one or more parts of the first screen (S2070). Here, the mobile terminal 100 may control one or more parts of the first screen to be displayed in the form of PIP (Picture in Picture) or divided screens on the second display unit 151*b*.

The mobile terminal 100 may control transparency of at least one of the first display unit 151*a* and the second display unit 151*b* (S2071), may synthesize one or more parts of the first screen with one or more parts of the second screen (S2073), and may control the second display unit 151*b* to display the synthesized screen (S2075).

Here, the first screen may be a first layer screen of an image, and the second screen may be a second layer screen of the image.

The mobile terminal 100 may control the first display unit 151*a* to display one or more parts of the second screen (S2080). Once one or more parts (second screen from the current viewpoint) of the first screen displayed on the second display unit 151*b* have been changed, the mobile terminal 100 may control the first display unit 151*a* to display the changed one or more parts of the first screen (second screen from the current viewpoint).

Figure 21:
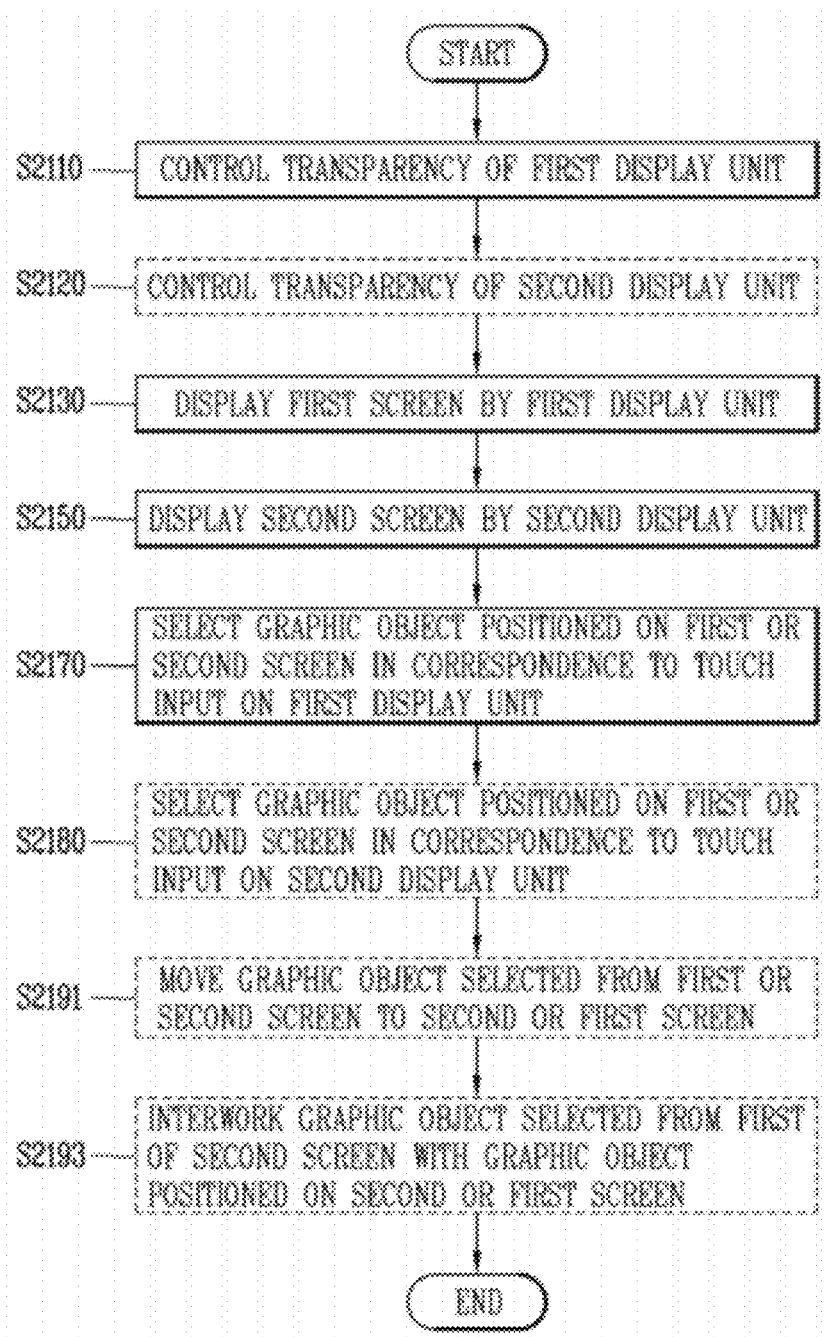
FIG. 21 is a flowchart showing a method for providing a user interface according to another embodiment of the present invention.

FIG. 21 is a flowchart showing a method for providing a user interface according to another embodiment of the present invention.

Referring to FIG. 21, the mobile terminal 100 controls transparency of the first display unit 151*a* (S2110). And, the mobile terminal 100 may control transparency of the second display unit 151*b* (S2120).

The mobile terminal 100 controls the first display unit 151*a* to display a first screen (S2130). And, the mobile terminal 100 controls the second display unit 151*b* to display a second screen (S2150).

The mobile terminal 100 selects a graphic object positioned on the first screen or the second screen in correspondence to touch input on the first display unit 151*a* (S2170).

Here, the mobile terminal 100 may select a graphic object positioned on the first screen in correspondence to a short touch or low pressure touch on the first display unit 151*a*, and may select a graphic object positioned on the second screen in correspondence to a long touch or high pressure touch on the first display unit 151*a*.

The mobile terminal 100 may select a graphic object positioned on the first or second screen in correspondence to a touch input on the second display unit 151*b* (S2180).

The mobile terminal 100 may select a graphic object having a deep depth on the first or second screen in correspondence to a touch input on the first display unit 151*a*, and may select a graphic object having a shallow depth on the first or second screen in correspondence to a touch input on the second display unit 151*b*.

The mobile terminal 100 may move a graphic object selected from the first screen, to the second screen and display the graphic object on the second screen. Alternatively, the mobile terminal 100 may move a graphic object selected from the second screen, to the first screen and display the graphic object on the first screen (S2191).

The mobile terminal 100 may interwork a graphic object selected from the first screen, with a graphic object positioned on the second screen. Alternatively, the mobile terminal 100 may interwork a graphic object selected from the second screen, with a graphic object positioned on the first screen (S2193).

Figure 22:
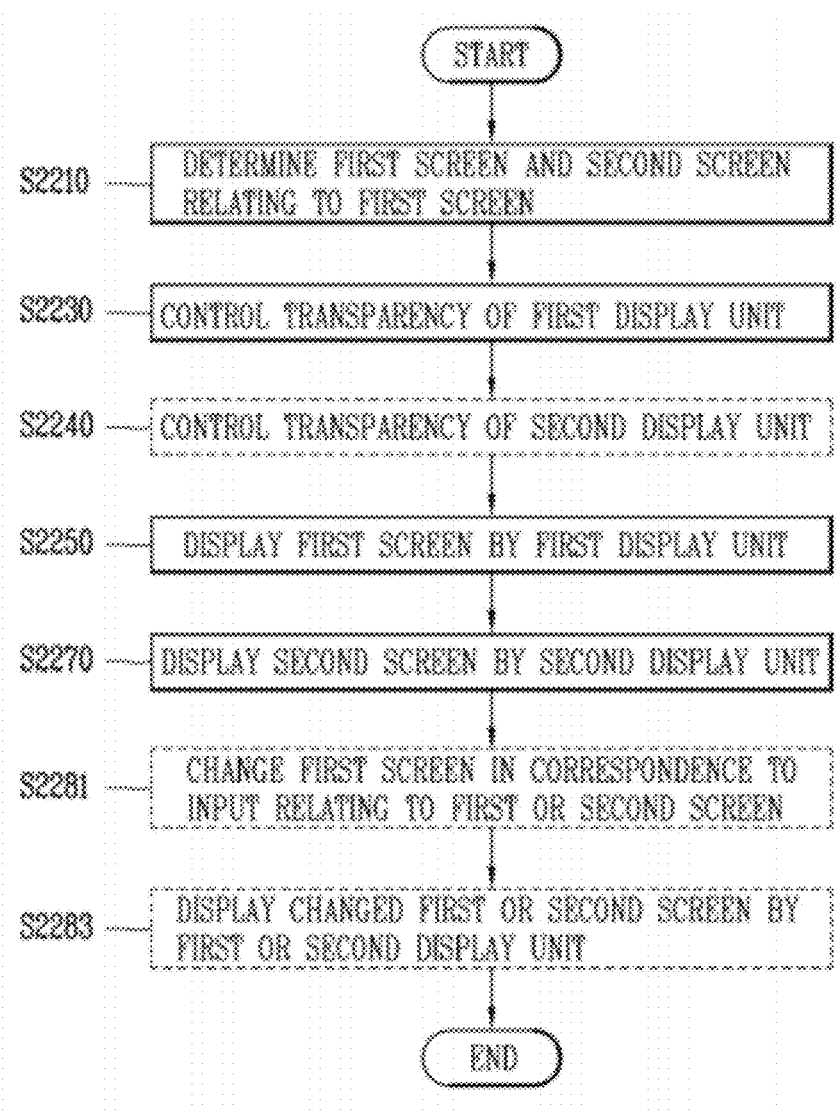
FIG. 22 is a flowchart showing a method for providing a user interface according to still another embodiment of the present invention.

FIG. 22 is a flowchart showing a method for providing a user interface according to still another embodiment of the present invention.

Referring to FIG. 22, the mobile terminal 100 determines a first screen, and a second screen relating to the first screen (S2210).

The mobile terminal 100 controls transparency of the first display unit 151*a* (S2230). And, the mobile terminal 100 may control transparency of the second display unit 151*b* (S2240).

The mobile terminal 100 controls the first display unit 151*a* to display the first screen (S2250). And, the mobile terminal 100 controls the second display unit 151*b* to display the second screen (S2270).

The mobile terminal 100 selects a graphic object positioned on the first screen or the second screen in correspondence to touch input on the first display unit 151*a* (S2170).

The mobile terminal 100 may change the second screen in correspondence to an input relating to the first screen, or may change the first screen in correspondence to an input relating to the second screen (S2281). The mobile terminal 100 may control the first display unit 151*a* to display the changed first screen, or may control the second display unit 151*b* to display the changed second screen (S2283).

Alternatively, the mobile terminal 100 may control the first display unit 151*a* to display a mirror image of the first screen, and may control transparency of the second display unit 151*b* so that the mirror image of the first screen can be viewed.

Contents of the second screen may have a time relation with contents of the first screen. Alternatively, the contents of the second screen may have a spatial enlargement or contraction relation with the contents of the first screen. Alternatively, the contents of the second screen may include user interface components used to change the contents of the first screen. Alternatively, the contents of the second screen may include details or additional information of the contents of the first screen.

Alternatively, the contents of the second screen may be combined or interworked with the contents of the first screen. Alternatively, the contents of the second screen may include a list of items homogeneous with the contents of the first screen. The contents of the first screen and the contents of the second screen may be changed in correspondence to touch inputs on the first display unit 151*a* and the second display unit 151*b*, respectively.

The method for providing a user interface of a mobile terminal according to the present invention may be understood in a similar manner to the mobile terminal according to the present invention which has been aforementioned with reference to FIGS. 1 to 19, and thus its detailed explanations will be omitted.

The aforementioned method may be implemented as a program code stored in a computer-readable storage medium. The storage medium may include ROM, RAM, CD-ROM, a magnetic tape, a floppy disc, an optical data storage device, etc. And, the storage medium may be implemented as carrier wave (transmission through the Internet).

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A method for providing a user interface of a mobile terminal, the method comprising:

displaying a first screen via a first display unit of the mobile terminal, wherein the first screen is a first layer screen of an image;

displaying a second screen via a second display unit of the mobile terminal, wherein the second screen is a second layer screen of the image;

controlling a degree of transparency of the first display unit to permit viewing of at least a portion of the second screen through the first display unit, wherein the degree of the transparency is controlled such that the transparency is changed throughout the first display unit;

combining the first layer screen and the second layer screen to display the image on the first display unit or the second display unit;

selecting a first graphic object on the first screen in response to a first type touch input received via the first display unit; and selecting a second graphic object on the second screen in response to a second type touch input received via the first display unit, wherein the first type touch input and the second type touch input are determined with reference to a threshold duration or threshold pressure.

2. The method of claim 1, further comprising displaying one or more parts of the second screen via the first display unit when the first display unit and the second display unit are configured to be in an overlapping configuration by controlling the transparency of the first display unit.

3. The method of claim 1, further comprising controlling the second display unit to display a mirror image of the second screen, wherein the transparency of the first display unit is controlled such that the mirror image of the second screen is viewable through the first display unit.

4. The method of claim 1, further comprising displaying one or more parts of the first screen via the second display unit.

5. The method of claim 4, wherein the one or more parts of the first screen are displayed in a PIP (Picture in Picture) screen or divided screens on the second display unit.

6. The method of claim 4, further comprising:
changing or editing the one or more parts of the first screen displayed on the second display unit; and
displaying the changed or edited one or more parts of the first screen on the first display unit.

7. The method of claim 4, wherein the displaying of the one or more parts of the first screen via the second display unit comprises:
combining the one or more parts of the first screen with one or more parts of the second screen; and
displaying the combined screen via the second display unit.

8. The method of claim 7, wherein the transparency of the first display unit is controlled before the combining of the one or more parts of the first screen with the one or more parts of the second screen.

9. The method of claim 1, wherein:
the first graphic object of the first screen is selected when the first type touch input is shorter than the threshold duration or lower than the threshold pressure; and
the second graphic object of the second screen is selected when the second type touch input is longer than the threshold duration or higher than the threshold pressure.

10. The method of claim 1, further comprising selecting a graphic object of the first screen or the second screen in response to a touch input received via the first display unit or the second display unit,
wherein:
the graphic object of the first screen or the second screen has a three-dimensional depth;
a graphic object having a deep depth is selected from the first screen or the second screen when the touch input is received via the first display unit; and
a graphic object having a shallow depth is selected from the first screen or the second screen when the touch input is received via the second display unit.

11. The method of claim 1, further comprising transferring the first graphic object selected from the first screen to the second screen, or transferring the second graphic object selected from the second screen to the first screen such that the selected first graphic object is displayed on the second screen or the selected second graphic object is displayed on the first screen.

12. The method of claim 1, further comprising combining the first graphic object selected from the first screen with a graphic object positioned on the second screen, or combining the second graphic object selected from the second screen with a graphic object positioned on the first screen.

13. The method of claim 1, wherein the first screen is determined based on the second screen or vice versa such that the first screen and the second screen are displayed cooperatively according to the determination.

14. The method of claim 13, further comprising:
changing the second screen in response to an input relating to the first screen, or changing the first screen in response to an input relating to the second screen; and
controlling the second display unit to display the changed second screen, or controlling the first display unit to display the changed first screen, respectively.

15. The method of claim 13, wherein:
contents of the second screen have a previous-next relationship with contents of the first screen,
contents of the second screen are generated by magnifying or minimizing at least a portion of contents of the first screen,
contents of the second screen comprise user interface components used to change contents of the first screen,
contents of the second screen comprise detailed or additional information related to contents of the first screen,
contents of the second screen comprise a list of items related to contents of the first screen, or
contents of the first screen and contents of the second screen are switched in response to a touch input received via the first display unit or the second display unit.

16. A mobile terminal, comprising:
a first display unit configured to display a first screen, wherein the first screen is a first layer screen of an image;
a second display unit configured to display a second screen, wherein the second screen is a second layer screen of the image; and
a controller configured to:
control a degree of transparency of the first display unit to allow viewing of at least a portion of the second screen through the first display unit, wherein the degree of the transparency is controlled such that the transparency is changed throughout the first display unit;
combine the first layer screen and the second layer screen to display the image on the first display unit or the second display unit;
select a first graphic object on the first screen in response to a first type touch input received via the first display unit; and
select a second graphic object on the second screen in response to a second type touch input received via the first display unit,
wherein the first type touch input and the second type touch input are determined with reference to a threshold duration or threshold pressure.

17. The mobile terminal of claim 16, further comprising a module configured to allow a relative motion of the first display unit and the second display unit such that the first display unit and the second display unit are positioned in an overlapping configuration as a result of the relative motion.

18. The mobile terminal of claim 17, wherein the second screen is viewable only via the second display unit when the first display unit and the second display unit are not in the overlapping configuration or when the transparency of the first display unit does not allow the viewing of the second screen through the first display unit.

19. The mobile terminal of claim 17, wherein the relative motion comprises at least a rotation or a sliding.

20. The mobile terminal of claim 16, wherein the controller is further configured to transfer the first graphic object selected from the first screen to the second screen or to transfer the second graphic object selected from the second screen to the first screen such that the selected first graphic object is displayed on the second screen or the selected second graphic object is displayed on the first screen via at least the first or second display unit as a result of the transfer.

21. The mobile terminal of claim 16, wherein the controller is further configured to combine the first graphic object selected from the first screen with a graphic object positioned on the second screen such that the graphic object combined with the first graphic object is displayed on the second screen via at least the first or second display unit or to combine the second graphic object selected from the second screen with a graphic object positioned on the first screen such that the graphic object combined with the second graphic object is displayed on the first screen via at least the first or second display unit.

22. The mobile terminal of claim 16, wherein the controller is further configured to determine the first screen based on the second screen or vice versa such that the first screen and the second screen are displayed cooperatively according to the determination.

23. The mobile terminal of claim 22, wherein the controller is further configured to change contents of the second screen when contents of the first screen are changed such that the changed contents of both the first screen and the second screen are displayed concurrently via at least the first display unit or the second display unit.

24. The mobile terminal of claim 23, further comprising an input unit comprising touch screens of the first and second display units, wherein the contents of the first screen displayed via the first display unit are changed in response to a single input received via the input unit, the controller changing the contents of both the first screen and the second screen concurrently in response to the single input, and wherein the changed contents of both the first screen and the second screen are noticeable via the first display unit.

25. The mobile terminal of claim 22, wherein the controller is further configured to:
 change the second screen in response to an input relating to the first screen, or change the first screen in response to an input relating to the second screen; and
 control the second display unit to display the changed second screen, or control the first display unit to display the changed first screen, respectively.

26. The mobile terminal of claim 16, wherein the controller is further configured to cause displaying of one or more parts of the first screen via the second display unit.

27. A mobile terminal, comprising:
 a first display unit configured to display a first screen including a first graphic object, wherein the first screen is a first layer screen of an image;
 a second display unit substantially overlapping the first display unit and configured to display a second screen including a second graphic object, wherein the second screen is a second layer screen of the image;
 an input unit configured to receive a touch input and comprising at least one touch screen included in at least the first or second display unit; and
 a controller configured to:
 control transparency of the first display unit such that the transparency is changed throughout the first display unit and both the first screen and the second screen are viewable through the first display unit; and
 combine the first layer screen and the second layer screen to display the image on the first display unit or the second display unit,
 wherein:
 the first graphic object of the first screen is selected when the touch input is a first type touch input;
 the second graphic object of the second screen is selected when the touch input is a second type touch input; and
 the first type touch input and the second type touch input are determined with reference to a threshold duration or threshold pressure.

* * * * *